United States Patent
Cook et al.

(10) Patent No.: US 10,016,919 B2
(45) Date of Patent: Jul. 10, 2018

(54) METHOD OF MAKING AN ARTICLE OF FOOTWEAR WITH A SEGMENTED PLATE

(71) Applicant: NIKE, Inc., Beaverton, OR (US)

(72) Inventors: Christopher S. Cook, Portland, OR (US); David J. Roulo, Portland, OR (US)

(73) Assignee: NIKE, Inc., Beaverton, OR (US)

(*) Notice: Subject to any disclaimer, the term of this patent is extended or adjusted under 35 U.S.C. 154(b) by 130 days.

(21) Appl. No.: 14/754,978

(22) Filed: Jun. 30, 2015

(65) Prior Publication Data

US 2016/0001478 A1 Jan. 7, 2016

Related U.S. Application Data

(60) Provisional application No. 62/020,634, filed on Jul. 3, 2014.

(51) Int. Cl.
*B29C 45/14* (2006.01)
*B29D 35/06* (2010.01)
(Continued)

(52) U.S. Cl.
CPC ...... *B29C 45/14008* (2013.01); *A43B 13/026* (2013.01); *A43B 13/12* (2013.01); *A43B 13/122* (2013.01); *A43B 13/141* (2013.01); *A43C 15/02* (2013.01); *A43C 15/161* (2013.01); *B29C 45/14467* (2013.01); *B29D 35/061* (2013.01); *B29D 35/081* (2013.01);
(Continued)

(58) Field of Classification Search
None
See application file for complete search history.

(56) References Cited

U.S. PATENT DOCUMENTS 3,187,073 A * 6/1965 Bingham, Jr. ........... A43B 5/06
 12/142 R
3,480,979 A * 12/1969 Gammons ............ A43C 15/161
 12/142 R
(Continued)

FOREIGN PATENT DOCUMENTS

DE 4200730 A1 7/1993
JP 01320001 * 12/1989
(Continued)

OTHER PUBLICATIONS

Taiwan Intellectual Property Office, Office Action and Search Report for Taiwan Application No. 104121528, dated Feb. 22, 2017.
(Continued)

*Primary Examiner* — Edmund Lee
(74) *Attorney, Agent, or Firm* — Honigman Miller Schwartz and Cohn LLP; Matthew H. Szalach; Jonathan P. O'Brien

(57) ABSTRACT

A method of making an article of footwear is disclosed. The method may generally include placing a first rigid member into a first region of a molding cavity and placing a second rigid member into a second region of the molding cavity. The first rigid member may be spaced from a first cleat and the second rigid member may be spaced from a second cleat. A second material may be injected into the first region and into the second region to form a sole comprising a first plate member and a second plate member.

17 Claims, 17 Drawing Sheets

(51) Int. Cl.
    *A43B 13/02*     (2006.01)
    *A43B 13/12*     (2006.01)
    *A43B 13/14*     (2006.01)
    *A43C 15/02*     (2006.01)
    *A43C 15/16*     (2006.01)
    *B29D 35/08*     (2010.01)
    *B29D 35/14*     (2010.01)

(52) U.S. Cl.
    CPC ......... *B29D 35/084* (2013.01); *B29D 35/087* (2013.01); *B29D 35/142* (2013.01); *B29C 2045/1454* (2013.01)

(56) References Cited

U.S. PATENT DOCUMENTS

| | | | | |
|---|---|---|---|---|
| 3,529,370 A | * | 9/1970 | Bernier | A43C 15/167 |
| | | | | 264/244 |
| 3,735,507 A | * | 5/1973 | Granger | A43C 15/161 |
| | | | | 36/59 R |
| 3,738,026 A | | 6/1973 | Granger | |
| 3,876,176 A | * | 4/1975 | Morin | A43B 5/001 |
| | | | | 249/127 |
| 3,925,529 A | * | 12/1975 | Bernier | A43C 15/161 |
| | | | | 264/244 |
| 4,348,003 A | * | 9/1982 | Beneteau | B29C 45/14778 |
| | | | | 249/142 |
| 4,562,606 A | * | 1/1986 | Folschweiler | B29D 35/082 |
| | | | | 12/142 RS |
| 4,984,320 A | * | 1/1991 | Curley, Jr. | A43B 13/12 |
| | | | | 12/142 P |
| 7,832,117 B2 | | 11/2010 | Auger et al. | |
| 2002/0125611 A1 | * | 9/2002 | Yin | B29D 35/142 |
| | | | | 264/244 |
| 2012/0266490 A1 | | 10/2012 | Atwal et al. | |

FOREIGN PATENT DOCUMENTS

| | | |
|---|---|---|
| JP | 05064601 * | 3/1993 |
| JP | 2916976 * | 7/1999 |
| KR | 10-0802067 B1 | 2/2008 |
| TW | 537873 B | 6/2003 |
| TW | M311289 U | 5/2007 |
| WO | WO-2013184497 A2 | 12/2013 |

OTHER PUBLICATIONS

Taiwan Intellectual Property Office, Office Action for TW Application No. 104121528, dated Oct. 31, 2017.
State Intellectual Property Office (PRC), Office Action for CN Application No. 201580044439.7, dated Feb. 24, 2018.

* cited by examiner

METHOD OF MAKING AN ARTICLE OF FOOTWEAR WITH A SEGMENTED PLATE

CROSS REFERENCE TO RELATED APPLICATION

This application Claims the benefit of U.S. Provisional Patent Application Ser. No. 62/020,634, filed Jul. 3, 2014, the entire contents of which are hereby incorporated by reference.

FIELD

The present disclosure relates generally to methods of making an article of footwear for track events as well as an article of footwear.

BACKGROUND

This section provides background information related to the present disclosure which is not necessarily prior art.

Conventional articles of footwear used in track and field events are typically constructed with a flexible sole structure having one or more cleats or spikes that aid an athlete in gripping the ground during use. For example, conventional articles of footwear used in track and field events have an outsole formed from foam or rubber and a series of metal spikes extending from the outsole. The foam or rubber material provides the article of footwear with a degree of flexibility while the spikes increase the ability of the article of footwear to grip the ground during use. Such increases in flexibility and grip aid the athlete during running, jumping, and lateral (i.e., side-to-side) movements.

While conventional articles of footwear used in track and field events adequately provide an athlete with flexibility and grip, such articles do not provide energy return to the athlete. Namely, when the sole structure of a conventional article bends, the general flexibility of the sole structure does not store a significant amount of energy. This is due in large part to the nature of the materials used in constructing the sole structure, as these materials are relatively flexible and, as such, require little energy to bend from a rest position to a flexed position. Accordingly, little energy is stored in making such movements and, therefore, little energy can be returned to the athlete when the sole structure is returned from the flexed position to the rest position.

BRIEF DESCRIPTION OF THE DRAWINGS

The configurations can be better understood with reference to the following drawings and description. The components in the figures are not necessarily to scale, emphasis instead being placed upon illustrating the principles of the configurations. Moreover, in the figures, like reference numerals designate corresponding parts throughout the different views.

DESCRIPTION

Figure 1:
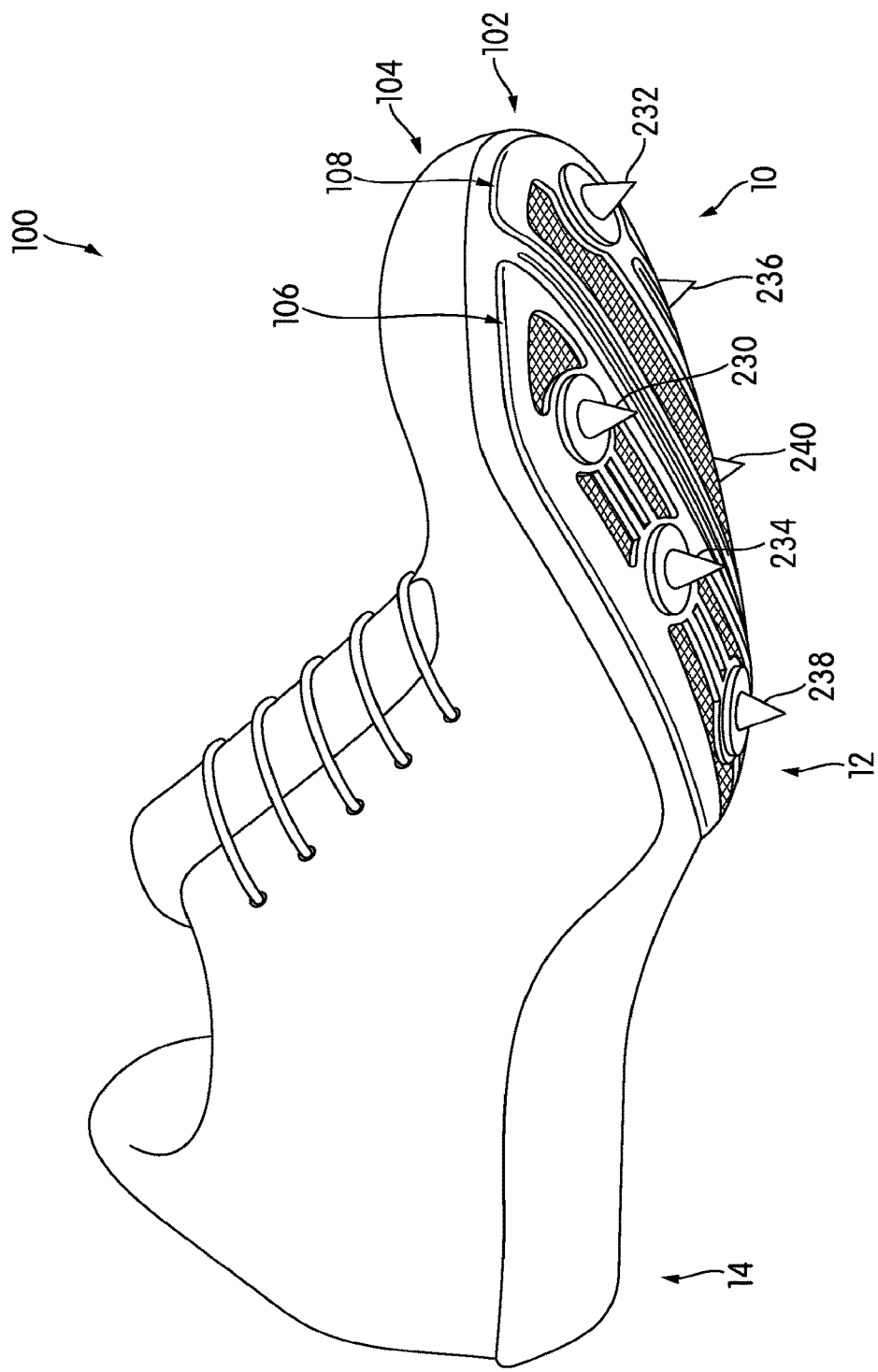
FIG. 1 is perspective view of an exemplary configuration of an article of footwear including a sole plate having cleats in accordance with the principles of present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

A method for making an article of footwear, and the article of footwear made using the method, are disclosed. The method may generally include placing a first rigid member into a first region of a molding cavity of a first mold half and placing a second rigid member into a second region of the molding cavity of the first mold half. The first rigid member may be spaced from a first cleat and the second rigid member may be spaced from a second cleat. In some configurations, the first rigid member is attached to a molding top or second mold half. A second material may be injected into the first region and into the second region to form a sole comprising a first plate member and a second plate member. In some configurations, the first plate member includes a heel region formed of the second material. In some instances, the heel region may separate a notch region from a medial side of the article of footwear and the heel region may separate the notch region from a lateral side of the article of footwear. The method allows a resulting article of footwear to be more flexible along a lateral axis than along a longitudinal axis when compared to conventional articles of footwear. As such, the resulting article of footwear can store an even greater amount of energy along the longitudinal axis while maintaining a degree of flexibility along the lateral axis of the heel portion. In one example, the article of footwear can provide an improved amount of energy return during use.

The method may include providing a molding system including a molding cavity formed in a first mold half and a molding top or second mold half, the molding cavity having a first region and a second region. Moreover, the method may include placing a first cleat into the first region of the molding cavity and placing a second cleat into the second region of the molding cavity. Additionally, the method may include providing a first material comprising a first rigid member and a second rigid member. Moreover, the method may include placing the first rigid member into the first region, the first rigid member being spaced from the first cleat. Further, the method may include placing the second rigid member into the second region, the second rigid member being spaced from the second cleat. Additionally, the method may include placing the second mold half onto the first mold half. Moreover, the method may include injecting a second material into the first region and into the second region to form a sole comprising a first plate member and a second plate member. Further, the second material may directly contact the first cleat and the second material may directly contact the first rigid member, wherein the second material adheres the first cleat to the first rigid member. Additionally, the second material may directly contact the second cleat and the second material may directly contact the second rigid member, wherein the second material adheres the second cleat to the second rigid member. Moreover, the first plate member has a first edge having a first contour corresponding to a second contour of a second edge of the second plate member.

Placing the first rigid member into the first region of the molding cavity and placing the second rigid member into the second region of the molding cavity may also include providing the first plate member with a heel region formed of the second material. Moreover, the heel region may separate a notch region from a medial side of the article of footwear. Additionally, the heel region may separate the notch region from a lateral side of the article of footwear. Further, the notch region may extend from an outer edge of a heel portion of the article of footwear towards a forefoot portion of the article of footwear.

Placing the first rigid member into the first region of the molding cavity and placing the second rigid member into the second region of the molding cavity may also include providing the first plate member with a heel region formed of the second material. Moreover, the heel region may separate a notch region from a medial side of the article of footwear. Additionally, the heel region may separate the notch region from a lateral side of the article of footwear. Further, the notch region may extend from an outer edge of a heel portion of the article of footwear towards a forefoot portion of the article of footwear. Moreover, the notch region may extend in a substantially longitudinal direction of the article of footwear on a centrally located position of the article of footwear.

Placing the first rigid member into the first region of the molding cavity and placing the second rigid member into the second region of the molding cavity may also include providing the first plate member with a heel region formed of the second material. Moreover, the heel region may separate a notch region from a medial side of the article of footwear. Additionally, the heel region may separate the notch region from a lateral side of the article of footwear. Further, the notch region may extend from an outer edge of a heel portion of the article of footwear towards a forefoot portion of the article of footwear. Moreover, the notch region may extend in a substantially longitudinal direction of the article of footwear on a centrally located position of the article of footwear. Additionally, the first rigid member may extend in the substantially longitudinal direction of the article of footwear on the centrally located position.

Placing the first rigid member into the first region of the molding cavity and placing the second rigid member into the second region of the molding cavity may also include providing the first plate member with a heel region formed of the second material. Moreover, the heel region may separate a notch region from a medial side of the article of footwear. Additionally, the heel region may separate the notch region from a lateral side of the article of footwear.

Further, the notch region may extend from an outer edge of a heel portion of the article of footwear towards a forefoot portion of the article of footwear. Moreover, the notch region may extend in a substantially longitudinal direction of the article of footwear on a centrally located position of the article of footwear. Additionally, the first rigid member may extend in the substantially longitudinal direction of the article of footwear on the centrally located position. Further, the molding system may further include a second molding top or third mold half and/or the method may further include one or more of the steps of: removing the first molding top (second mold half); wherein an upper surface of the first plate member and an upper surface of the second plate member form a second molding cavity; placing the second molding top (third mold half) onto the second molding cavity (first mold half); and injecting a third material into the second molding cavity.

Placing the first rigid member into the first region of the molding cavity and placing the second rigid member into the second region of the molding cavity may also include providing the first plate member with a heel region formed of the second material. Moreover, the heel region may separate a notch region from a medial side of the article of footwear. Additionally, the heel region may separate the notch region from a lateral side of the article of footwear. Further, the notch region may extend from an outer edge of a heel portion of the article of footwear towards a forefoot portion of the article of footwear. Moreover, the notch region may extend in a substantially longitudinal direction of the article of footwear on a centrally located position of the article of footwear. Additionally, the first rigid member may extend in the substantially longitudinal direction of the article of footwear on the centrally located position. Further, the molding system may further include a second molding top or third mold half and/or the method may further include one or more of the steps of: removing the first molding top (second mold half); wherein an upper surface of the first plate member and an upper surface of the second plate member form a second molding cavity; placing the second molding top (third mold half) onto the second molding cavity (first mold half); and injecting a third material into the second molding cavity. Additionally, the third material may attach the first plate member to an upper for the article of footwear. Further, the third material attaches the second plate member to the upper.

Placing the first rigid member into the first region of the molding cavity and placing the second rigid member into the second region of the molding cavity may also include providing the first plate member with a heel region formed of the second material. Moreover, the heel region may separate a notch region from a medial side of the article of footwear. Additionally, the heel region may separate the notch region from a lateral side of the article of footwear. Further, the notch region may extend from an outer edge of a heel portion of the article of footwear towards a forefoot portion of the article of footwear. Moreover, the notch region may extend in a substantially longitudinal direction of the article of footwear on a centrally located position of the article of footwear. Additionally, the first rigid member may extend in the substantially longitudinal direction of the article of footwear on the centrally located position. Further, the molding system may further include a second molding top or third mold half and/or the method may further include one or more of the steps of: removing the first molding top (second mold half); wherein an upper surface of the first plate member and an upper surface of the second plate member form a second molding cavity; placing the second molding top (third mold half) onto the second molding cavity (first mold half); and injecting a third material into the second molding cavity. Additionally, the third material may attach the first plate member to an upper of the article of footwear. Further, the third material attaches the second plate member to the upper. Additionally, the third material may be less rigid than the second material.

Placing the first rigid member into the first region of the molding cavity and placing the second rigid member into the second region of the molding cavity may also include providing the first plate member with a heel region formed of the second material. Moreover, the heel region may separate a notch region from a medial side of the article of footwear. Additionally, the heel region may separate the notch region from a lateral side of the article of footwear. Further, the notch region may extend from an outer edge of a heel portion of the article of footwear towards a forefoot portion of the article of footwear. Moreover, the notch region may extend in a substantially longitudinal direction of the article of footwear on a centrally located position of the article of footwear. Additionally, the first rigid member may extend in the substantially longitudinal direction of the article of footwear on the centrally located position. Further, the molding system may further include a second molding top or third mold half and/or the method may further include one or more of the steps of: removing the first molding top (second mold half); wherein an upper surface of the first plate member and an upper surface of the second plate member form a second molding cavity; placing the second molding top (third mold half) onto the second molding cavity (first mold half); and injecting a third material into the second molding cavity. Additionally, the third material may attach the first plate member to an upper of the article of footwear. Further, the third material attaches the second plate member to the upper. Additionally, the third material may be less rigid than the second material. Moreover, the third material may be absent from the notch region.

Placing the first rigid member into the first region of the molding cavity and placing the second rigid member into the second region of the molding cavity may also include providing the first plate member with a heel region formed of the second material. Moreover, the heel region may separate a notch region from a medial side of the article of footwear. Additionally, the heel region may separate the notch region from a lateral side of the article of footwear. Further, the notch region may extend from an outer edge of a heel portion of the article of footwear towards a forefoot portion of the article of footwear. Moreover, the notch region may extend in a substantially longitudinal direction of the article of footwear on a centrally located position of the article of footwear. Additionally, the first rigid member may extend in the substantially longitudinal direction of the article of footwear on the centrally located position. Further, the molding system may further include a second molding top or third mold half and/or the method may further include one or more of the steps of: removing the first molding top (second mold half); wherein an upper surface of the first plate member and an upper surface of the second plate member form a second molding cavity; placing the second molding top (third mold half) onto the second molding cavity (first mold half); and injecting a third material into the second molding cavity. Additionally, the third material may attach the first plate member to an upper of the article of footwear. Further, the third material attaches the second plate member to the upper. Additionally, the third material may be less rigid than the second material. Moreover, the third material may be absent from the notch region. Further, the second material may extend on an upper surface of a flange of the first cleat and/or the second material may extend on a lower surface of the flange of the first cleat. Additionally, the second material may extend on an upper surface of a flange of the second cleat and/or the second material may extend on a lower surface of the flange of the second cleat.

Placing the first rigid member into the first region of the molding cavity and placing the second rigid member into the second region of the molding cavity may also include providing the first plate member with a heel region formed of the second material. Moreover, the heel region may separate a notch region from a medial side of the article of footwear. Additionally, the heel region may separate the notch region from a lateral side of the article of footwear. Further, the notch region may extend from an outer edge of a heel portion of the article of footwear towards a forefoot portion of the article of footwear. Moreover, the notch region may extend in a substantially longitudinal direction of the article of footwear on a centrally located position of the article of footwear. Additionally, the first rigid member may extend in the substantially longitudinal direction of the article of footwear on the centrally located position. Further, the molding system may further include a second molding top or third mold half and/or the method may further include one or more of the steps of: removing the first molding top (second mold half); wherein an upper surface of the first plate member and an upper surface of the second plate member form a second molding cavity; placing the second molding top (third mold half) onto the second molding cavity (first mold half); and injecting a third material into the second molding cavity. Additionally, the third material may attach the first plate member to an upper of the article of footwear. Further, the third material attaches the second plate member to the upper. Additionally, the third material may be less rigid than the second material. Moreover, the third material may be absent from the notch region. Further, the second material may extend on an upper surface of a flange of the first cleat and/or the second material may extend on a lower surface of the flange of the first cleat. Additionally, the second material may extend on an upper surface of a flange of the second cleat and/or the second material may extend on a lower surface of the flange of the second cleat. Moreover, the second material may form a rib, the rib extending from an outer surface of the first rigid member. Further, the rib may have a shape corresponding to a shape of the first plate member.

Placing the first rigid member into the first region of the molding cavity and placing the second rigid member into the second region of the molding cavity may also include providing the first plate member with a heel region formed of the second material. Moreover, the heel region may separate a notch region from a medial side of the article of footwear. Additionally, the heel region may separate the notch region from a lateral side of the article of footwear. Further, the notch region may extend from an outer edge of a heel portion of the article of footwear towards a forefoot portion of the article of footwear. Moreover, the notch region may extend in a substantially longitudinal direction of the article of footwear on a centrally located position of the article of footwear. Additionally, the first rigid member may extend in the substantially longitudinal direction of the article of footwear on the centrally located position. Further, the molding system may further include a second molding top or third mold half and/or the method may further include one or more of the steps of: removing the first molding top (second mold half); wherein an upper surface of the first plate member and an upper surface of the second plate member form a second molding cavity; placing the second molding top (third mold half) onto the second molding cavity (first mold half); and injecting a third material into the second molding cavity. Additionally, the third material may attach the first plate member to an upper for the article of footwear. Further, the third material attaches the second plate member to the upper. Additionally, the third material may be less rigid than the second material. Moreover, the third material may be absent from the notch region. Further, the second material may extend on an upper surface of a flange of the first cleat and/or the second material may extend on a lower surface of the flange of the first cleat. Additionally, the second material may extend on an upper surface of a flange of the second cleat and/or the second material may extend on a lower surface of the flange of the second cleat. Moreover, the second material may form a rib, the rib extending from an outer surface of the first rigid member. Further, the rib may have a shape corresponding to a shape of the first plate member. Additionally, the first material may include a plurality of carbon fibers. Moreover, the second material may be an elastomer.

Placing the first rigid member into the first region of the molding cavity and placing the second rigid member into the second region of the molding cavity may also include providing the first plate member with a heel region formed of the second material. Moreover, the heel region may separate a notch region from a medial side of the article of footwear. Additionally, the heel region may separate the notch region from a lateral side of the article of footwear. Further, the notch region may extend from an outer edge of a heel portion of the article of footwear towards a forefoot portion of the article of footwear. Moreover, the notch region may extend in a substantially longitudinal direction of the article of footwear on a centrally located position of the article of footwear. Additionally, the first rigid member may extend in the substantially longitudinal direction of the article of footwear on the centrally located position. Further, the molding system may further include a second molding top or third mold top and/or the method may further include one or more of the steps of: removing the first molding top (second mold half); wherein an upper surface of the first plate member and an upper surface of the second plate member form a second molding cavity; placing the second molding top (third mold half) onto the second molding cavity (first mold half); and injecting a third material into the second molding cavity. Additionally, the third material may attach the first plate member to an upper of the article of footwear. Further, the third material attaches the second plate member to the upper. Additionally, the third material may be less rigid than the second material. Moreover, the third material may be absent from the notch region. Further, the second material may extend on an upper surface of a flange of the first cleat and/or the second material may extend on a lower surface of the flange of the first cleat. Additionally, the second material may extend on an upper surface of a flange of the second cleat and/or the second material may extend on a lower surface of the flange of the second cleat. Moreover, the second material may form a rib, the rib extending from an outer surface of the first rigid member. Further, the rib may have a shape corresponding to a shape of the first plate member. Additionally, the first material may include a plurality of carbon fibers. Moreover, the second material may be an elastomer. Further, the second material may attach to sides of the first material.

Placing the first rigid member into the first region of the molding cavity and placing the second rigid member into the second region of the molding cavity may also include providing the first plate member with a heel region formed of the second material. Moreover, the heel region may separate a notch region from a medial side of the article of footwear. Additionally, the heel region may separate the notch region from a lateral side of the article of footwear. Further, the notch region may extend from an outer edge of a heel portion of the article of footwear towards a forefoot portion of the article of footwear. Moreover, the notch region may extend in a substantially longitudinal direction of the article of footwear on a centrally located position of the article of footwear. Additionally, the first rigid member may extend in the substantially longitudinal direction of the article of footwear on the centrally located position. Further, the molding system may further include a second molding top or third mold half and/or the method may further include one or more of the steps of: removing the first molding top (second mold half); wherein an upper surface of the first plate member and an upper surface of the second plate member form a second molding cavity; placing the second molding top (third mold half) onto the second molding cavity (first mold half); and injecting a third material into the second molding cavity. Additionally, the third material may attach the first plate member to an upper of the article of footwear. Further, the third material attaches the second plate member to the upper. Additionally, the third material may be less rigid than the second material. Moreover, the third material may be absent from the notch region. Further, the second material may extend on an upper surface of a flange of the first cleat and/or the second material may extend on a lower surface of the flange of the first cleat. Additionally, the second material may extend on an upper surface of a flange of the second cleat and/or the second material may extend on a lower surface of the flange of the second cleat. Moreover, the second material may form a rib, the rib extending from an outer surface of the first rigid member. Further, the rib may have a shape corresponding to a shape of the first plate member. Additionally, the first material may include a plurality of carbon fibers. Moreover, the second material may be an elastomer. Further, the second material may attach to sides of the first material. Additionally, the step of placing the first rigid member into the first region may position the first rigid member closer to the molding top than to the first cleat. Moreover, the step of placing the second rigid member into the second region may position the second rigid member closer to the molding top than to the second cleat.

Placing the first rigid member into the first region of the molding cavity and placing the second rigid member into the second region of the molding cavity may also include providing the first plate member with a heel region formed of the second material. Moreover, the heel region may separate a notch region from a medial side of the article of footwear. Additionally, the heel region may separate the notch region from a lateral side of the article of footwear. Further, the notch region may extend from an outer edge of a heel portion of the article of footwear towards a forefoot portion of the article of footwear. Moreover, the notch region may extend in a substantially longitudinal direction of the article of footwear on a centrally located position of the article of footwear. Additionally, the first rigid member may extend in the substantially longitudinal direction of the article of footwear on the centrally located position. Further, the molding system may further include a second molding top or third mold half and/or the method may further include one or more of the steps of: removing the first molding top (second mold half); wherein an upper surface of the first plate member and an upper surface of the second plate member form a second molding cavity; placing the second molding top (third mold half) onto the second molding cavity (first mold half); and injecting a third material into the second molding cavity. Additionally, the third material may attach the first plate member to an upper of the article of footwear. Further, the third material attaches the second plate member to the upper. Additionally, the third material may be less rigid than the second material. Moreover, the third material may be absent from the notch region. Further, the second material may extend on an upper surface of a flange of the first cleat and/or the second material may extend on a lower surface of the flange of the first cleat. Additionally, the second material may extend on an upper surface of a flange of the second cleat and/or the second material may extend on a lower surface of the flange of the second cleat. Moreover, the second material may form a rib, the rib extending from an outer surface of the first rigid member. Further, the rib may have a shape corresponding to a shape of the first plate member. Additionally, the first material may include a plurality of carbon fibers. Moreover, the second material may be an elastomer. Further, the second material may attach to sides of the first material. Additionally, the step of placing the first rigid member into the first region may include positioning the first rigid member closer to the molding top (second mold half) than to the first cleat. Moreover, the step of placing the second rigid member into the second region may include positioning the second rigid member closer to the molding top (second mold half) than to the second cleat. Additionally, the first material may be releasably attached to the molding top (second mold half), wherein the first material is removed from the molding top (second mold half) after injecting the second material into the first region and into the second region.

Placing the first rigid member into the first region of the molding cavity and placing the second rigid member into the second region of the molding cavity may also include providing the first plate member with a heel region formed of the second material. Moreover, the heel region may separate a notch region from a medial side of the article of footwear. Additionally, the heel region may separate the notch region from a lateral side of the article of footwear. Further, the notch region may extend from an outer edge of a heel portion of the article of footwear towards a forefoot portion of the article of footwear. Moreover, the notch region may extend in a substantially longitudinal direction of the article of footwear on a centrally located position of the article of footwear. Additionally, the first rigid member may extend in the substantially longitudinal direction of the article of footwear on the centrally located position. Further, the molding system may further include a second molding top or third mold half and/or the method may further include one or more of the steps of: removing the first molding top (second mold half); wherein an upper surface of the first plate member and an upper surface of the second plate member form a second molding cavity; placing the second molding top (third mold half) onto the second molding cavity (first mold half); and injecting a third material into the second molding cavity. Additionally, the third material may attach the first plate member to an upper of the article of footwear. Further, the third material attaches the second plate member to the upper. Additionally, the third material may be less rigid than the second material. Moreover, the third material may be absent from the notch region. Further, the second material may extend on an upper surface of a flange of the first cleat and/or the second material may extend on a lower surface of the flange of the first cleat.

Additionally, the second material may extend on an upper surface of a flange of the second cleat and/or the second material may extend on a lower surface of the flange of the second cleat. Moreover, the second material may form a rib, the rib extending from an outer surface of the first rigid member. Further, the rib may have a shape corresponding to a shape of the first plate member. Additionally, the first material may include a plurality of carbon fibers. Moreover, the second material may be an elastomer. Further, the second material may attach to sides of the first material. Additionally, the step of placing the first rigid member into the first region may include positioning the first rigid member closer to the molding top (second mold half) than to the first cleat. Moreover, the step of placing the second rigid member into the second region may include positioning the second rigid member closer to the molding top (second mold half) than to the second cleat. Additionally, the first material may be releasably attached to the molding top (second mold half) and wherein the first material is removed from the molding top (second mold half) after the injecting the second material into the first region and into the second region. Further, the first rigid member may extend along the first contour, the first rigid member maintaining a substantially constant first distance from the first edge. Moreover, the second rigid member may extend along the second contour, the second rigid member maintaining a substantially constant second distance from the second edge.

An article of footwear manufactured in accordance with the foregoing method is provided. Such a method may include placing the first rigid member into the first region of the molding cavity and placing the second rigid member into the second region of the molding cavity. The method may also include forming a heel region formed of the second material. Moreover, the heel region may separate a notch region from a medial side of the article of footwear. Additionally, the heel region may separate the notch region from a lateral side of the article of footwear. Further, the notch region may extend from an outer edge of a heel portion of the article of footwear towards a forefoot portion of the article of footwear. Moreover, the notch region may extend in a substantially longitudinal direction of the article of footwear on a centrally located position of the article of footwear. Additionally, the first rigid member may extend in the substantially longitudinal direction of the article of footwear on the centrally located position. Further, the molding system may further include a second molding top or third mold half and/or the method may further include one or more of the steps of: removing the first molding top (second mold half); wherein an upper surface of the first plate member and an upper surface of the second plate member form a second molding cavity; placing the second molding top (third mold half) onto the second molding cavity (first mold half); and injecting a third material into the second molding cavity. Additionally, the third material may attach the first plate member to an upper of the article of footwear. Further, the third material attaches the second plate member to the upper. Additionally, the third material may be less rigid than the second material. Moreover, the third material may be absent from the notch region. Further, the second material may extend on an upper surface of a flange of the first cleat and/or the second material may extend on a lower surface of the flange of the first cleat. Additionally, the second material may extend on an upper surface of a flange of the second cleat and/or the second material may extend on a lower surface of the flange of the second cleat. Moreover, the second material may form a rib, the rib extending from an outer surface of the first rigid member. Further, the rib may have a shape corresponding to a shape of the first plate member. Additionally, the first material may include a plurality of carbon fibers. Moreover, the second material may be an elastomer. Further, the second material may attach to sides of the first material. Additionally, the step of placing the first rigid member into the first region may include positioning the first rigid member closer to the molding top (second mold half) than to the first cleat. Moreover, the step of placing the second rigid member into the second region may include positioning the second rigid member closer to the molding top (second mold half) than to the second cleat. Additionally, the first material may be releasably attached to the molding top (second mold half) and wherein the first material is removed from the molding top (second mold half) after the injecting the second material into the first region and into the second region. Further, the first rigid member may extend along the first contour, the first rigid member maintaining a substantially constant first distance from the first edge. Moreover, the second rigid member may extend along the second contour, the second rigid member maintaining a substantially constant second distance from the second edge Other systems, methods, features and advantages of the configurations will be, or will become, apparent to one of ordinary skill in the art upon examination of the following figures and detailed description. It is intended that all such additional systems, methods, features and advantages be included within this description and this summary, be within the scope of the configurations, and be protected by the following claims.

For example, and in one configuration, a method is provided and includes inserting at least one cleat into a first mold half of a mold, inserting a first reinforcement member into a second mold half of the mold, closing the mold to define a first cavity between the first mold half and the second mold half, and maintaining a first gap between the at least one cleat and the first reinforcement member after the mold is closed. The method also includes injecting a first material into the first cavity and within the first gap to form a sole plate and attaching the sole plate to an article of footwear.

The method may also include separating the first mold half and the second mold half following formation of the sole plate to expose a surface of the sole plate within the first mold half and defining a second cavity between the first mold half and a third mold half.

A second material may be injected into the second cavity to form a midsole of the article of footwear, wherein injecting the second material into the second cavity attaches the sole plate to the midsole. Further, injecting the second material into the second cavity may cause the second material to contact the first reinforcement member and/or may include injecting a material having less stiffness than the first material.

In one configuration, inserting the first reinforcement member into the second mold half includes attaching the first reinforcement member to the second mold half via a releasable adhesive. Further, inserting the at least one cleat into the first mold half may include forming a second gap between a portion of the at least one cleat and a surface of the first mold half on an opposite side of the at least one cleat than the first gap. Injecting the first material into the first cavity may include injecting the first material into the second gap.

In another configuration, a method is provided and includes inserting a first reinforcement member into a first mold half of a mold, inserting a second reinforcement member into the first mold half of the mold to create a channel separating the first reinforcement member and the second reinforcement member and closing the mold to define a first cavity between the first mold half and a second mold half. The method also includes injecting a first material into the first cavity to form a sole plate incorporating the first reinforcement member and the second reinforcement member and attaching the sole plate to an article of footwear.

The method may also include separating the first mold half and the second mold half following formation of the sole plate to expose a surface of the sole plate within the first mold half and subsequently defining a second cavity between the first mold half and a third mold half. A second material may be injected into the second cavity to form a midsole of the article of footwear. Injecting the second material into the second cavity may include attaching the sole plate to the midsole and/or causing the second material to contact the first reinforcement member and the second reinforcement member. Further, injecting the second material into the second cavity may include injecting a material having less stiffness than the first material.

In one configuration, inserting the first reinforcement member and the second reinforcement member into the first mold half may include attaching the first reinforcement member and the second reinforcement member to the first mold half via a releasable adhesive.

At least once cleat may be inserted into the second mold half. Accordingly, injecting the first material may include surrounding a portion of the at least one cleat to fix a position of the at least one cleat relative to the first reinforcement member and the second reinforcement member.

With reference to the figures, a method for making an article of footwear is disclosed. For purposes of illustration, the article of footwear is shown as an article of footwear for use in track and field events. In other configurations, however, the article of footwear could be configured for use during hiking or for use in playing soccer, football, rugby, basketball, or baseball. In one configuration, a resulting article of footwear may provide an improved amount of energy return to a user during use of the article of footwear due to the rigidity of the sole plate described below and, further, due to the independent movement of various individual plates of the sole plate.

FIGS. 2-11 illustrate exemplary configurations of a molding process for making a segmented plate. It should be understood that the order of the steps illustrated is merely exemplary and the segmented plate may be made in a different order.

FIG. 1 illustrates an article of footwear 100, or simply article 100 including a sole plate 102 affixed to an upper 104. The upper 104 may be attached to the sole plate 102 by any known mechanism or method. For example, the upper 104 may be stitched to the sole plate 102 or the upper 104 may be glued to the sole plate 102. The upper 104 may be configured to receive a foot. The exemplary configuration shows a generic design for the upper. In some configurations, the upper 104 may include another type of design. For instance, the upper 104 may be a seamless warp knit tube of mesh. As shown, the sole plate 102 includes a first plate member 106 and a second plate member 108 that are separated from and independently movable relative to one another when attached to the upper 104. For example, the first plate member 106 and the second plate member 108 may be attached to a midsole of the article 100 (FIG. 13) which, in turn, is attached to the upper 104. The plate members 106, 108 may be attached to the midsole during formation of the sole plate 102 but may be moved relative to the upper 104 and relative to one another due to the separation of the members 106, 108 from one another and due to the relatively flexible nature of the material of the midsole as compared to the relatively rigid material of the plate members 106, 108.

Figure 2:
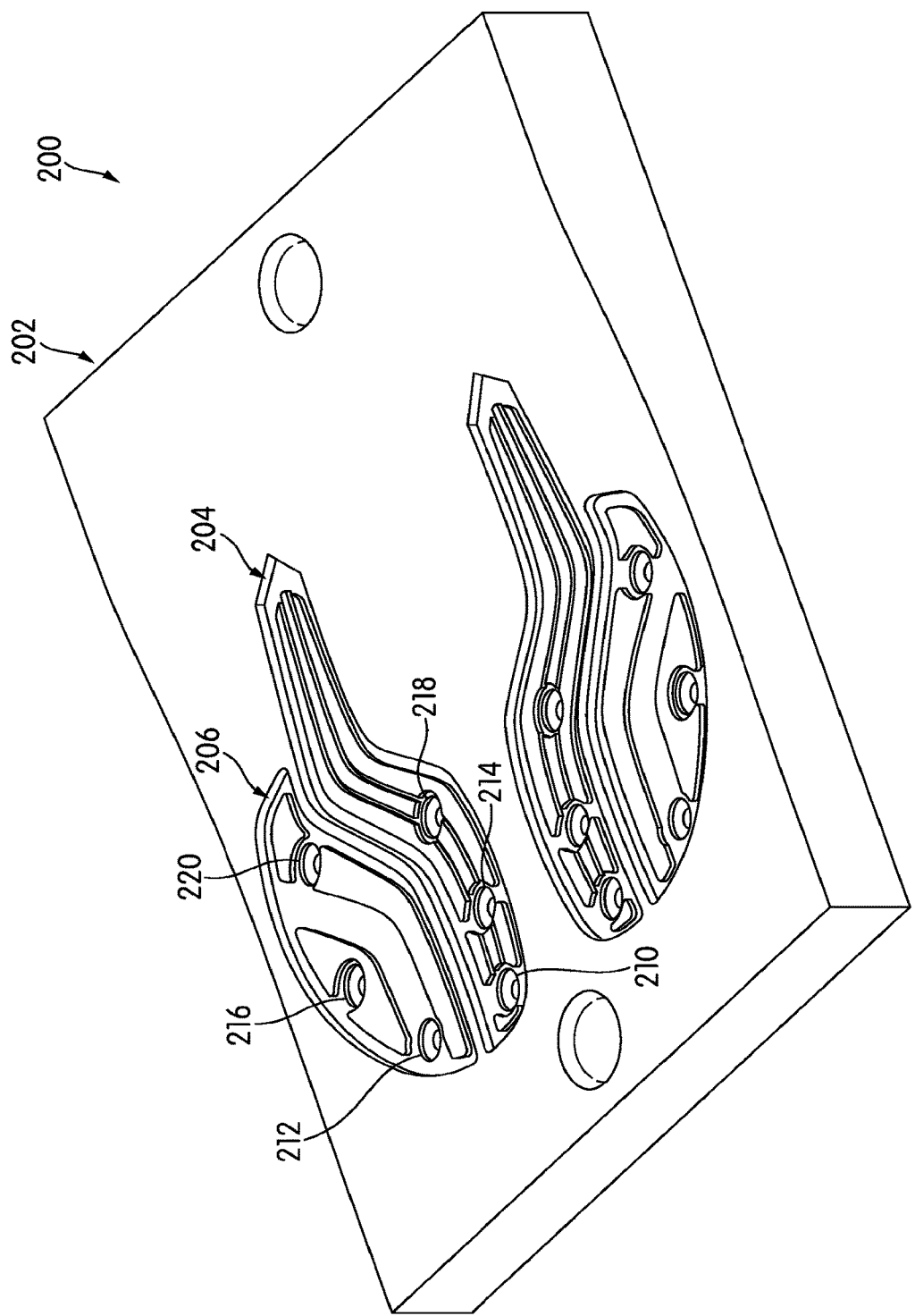
FIG. 2 is a perspective view of a first mold half of a molding system in accordance with the principles of the present disclosure.

FIG. 2 is a schematic view of an exemplary configuration of a molding system 200 that may be used to make the sole plate 102. In some configurations, the molding system 200 may be an injection mold. The molding system 200 may include one or more components typically associated with an injection mold, including components not described herein. In an exemplary configuration, the molding system 200 may include a first molding cavity or mold half 202. In some configurations, the first molding cavity 202 may be sized and dimensioned so as to include a cavity having a shape associated with a sole plate. In some configurations, the first molding cavity 202 may be specifically configured for a sole plate having spikes or cleats.

Generally, the term "plate member" as used in this detailed description and throughout the claims includes any sole configured to resist bending for increasing an amount of energy return during operation of the article 100. The molding system 200 may be configured to make a plate member of any type, shape, or configuration.

It should be understood that for the purposes of illustration, the molds and/or molding systems illustrated herein in various configurations are shown in a representative manner without illustration of multiple molds, inserts, and/or components that may be associated with the mold and/or molding system. Any of the molds and/or molding systems described herein may include similar or different constructions as are known in the art for facilitating removal of the finished parts after injection and cooling of the second material(s).

In some configurations, the molding system 200 may include provisions for making a matched pair of segmented plates. In an exemplary configuration, separate plate cavities may be used to form a segmented plate associated with a right foot and a segmented plate associated with a left foot. In other configurations, a single plate cavity may be used to form the segmented plates. In yet other configurations, a single plate cavity may include one or more plate cavities used for form cleated plate members associated with either foot.

In some configurations, a molding system may be a molding system that includes a pre-molded cleat member. In other configurations, a molding system may be a single mold. In other configurations, a molding system may be a multi-part molding system, including one or more mold inserts. In still other configurations, a molding system maybe a multi-stage molding system that includes two or more injections of second material into a single molding system or a multi-part molding system. In some cases, the order of molding the components of a cleat assembly, as well as the choice of molding system, may be chosen based on various characteristics, including but not limited to, one or more of: the second materials chosen for each component, the hardness or durability of the component, the temperature of second material, as well as other considerations. In addition, it should be understood that other molding systems other than the exemplary configurations illustrated herein may be used to form a segmented plate.

In some configurations, molding system 200 may include one or more components typically associated with an injection mold, including components not described herein. For example, in some configurations, molding system 200 may include a number of pins, including retractable pins that may be used to hold spikes or cleats in position within molding system 200.

In some configurations, the first molding cavity 202 may include one or more portions configured to correspond to different portions of a plate member. In an exemplary configuration, the first molding cavity 202 may include a first region 204 and a second region 206. In an exemplary configuration, first region 204 may correspond to a body of a first plate member 106 and second region 206 may correspond to a body of a second plate member 108. In an exemplary configuration, first region 204 may correspond to a shape illustrated in FIG. 2. For example, the first region 204 may have a medial portion substantially aligned with a first cleat cavity 210, a third cleat cavity 214, and a fifth cleat cavity 218, a lateral portion substantially extending in the longitudinal direction, and a transition portion extending between the medial portion and the lateral portion. In one example, the second region 206 may have an arcuate lateral edge and a medial edge having a first portion substantially extending in the longitudinal direction, a second portion substantially extending in the longitudinal direction, and a transition portion extending between the first portion and the second portion.

In other configurations, the first region 204 may correspond to different shapes associated with a cleat member body, including but not limited to hexagonal, cylindrical, conical, circular, square, rectangular, trapezoidal, diamond, ovoid, as well as other regular or irregular and geometric or non-geometric shapes.

In some configurations, the first molding cavity 202 may also include a first cleat cavity 210, a second cleat cavity 212, a third cleat cavity 214, a fourth cleat cavity 216, a fifth cleat cavity 218, and a sixth cleat cavity 220. In an exemplary configuration, the first cleat cavity 210, the third cleat cavity 214, and the fifth cleat cavity 218 may correspond to a first set of cleat cavities for the first plate member 106. Similarly, the second cleat cavity 212, the fourth cleat cavity 216, and the sixth cleat cavity 220 may correspond to a second set of cleat cavities for the second plate member 108. In some cases, the first set of cleat cavities and the second set of cleat cavities may be configured for fastener elements of cleat members. In particular, the fastener element may be configured to releasably attach the cleat member to an outsole.

Figure 10:
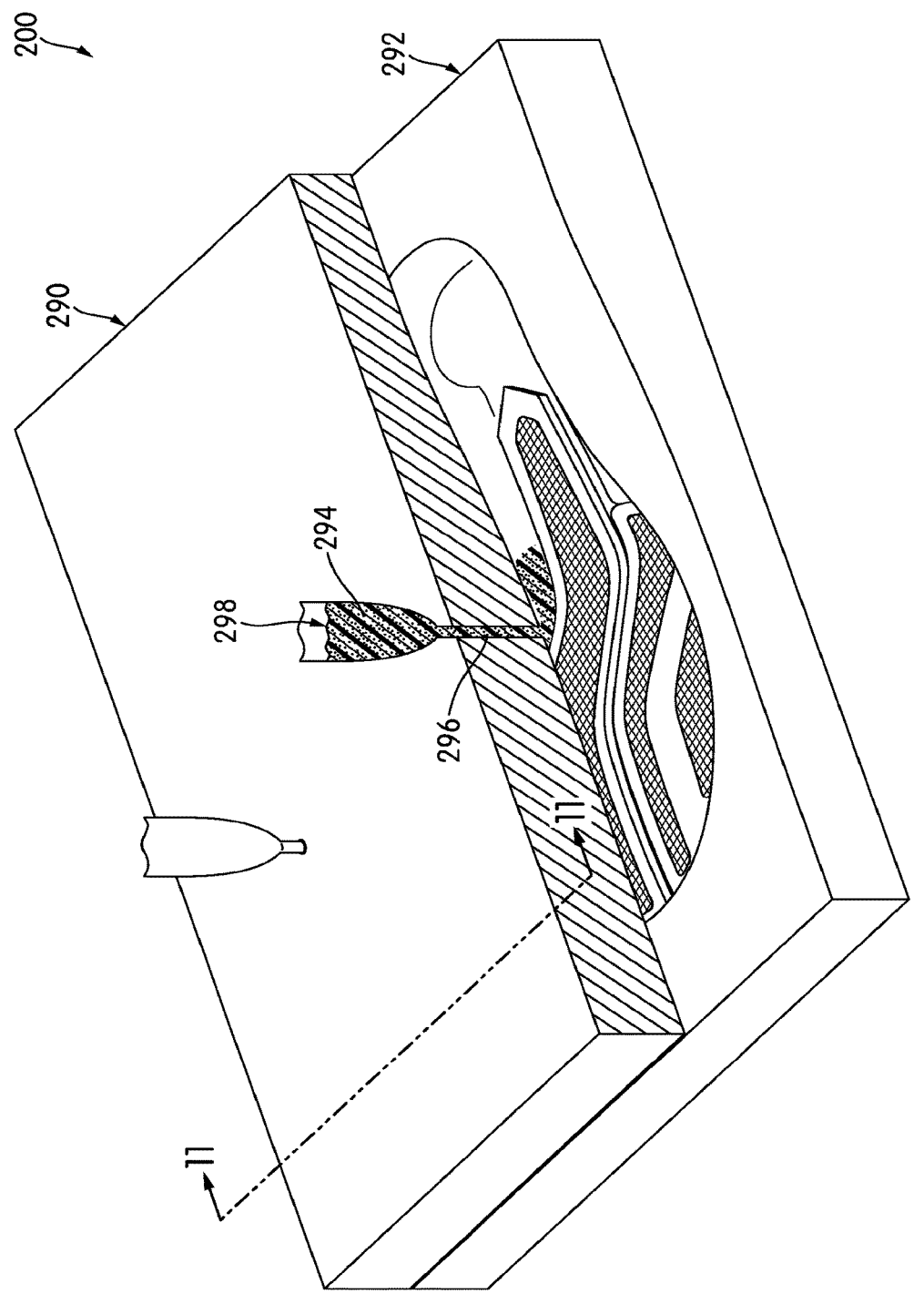
FIG. 10 is a perspective view of the first mold half of FIG. 2 with part of a third mold half removed to show a material being injected into an area between the first mold half and the third mold half.

As previously noted, the various configurations of the method of making an article of footwear shown in the figures may be intended to be used with a right foot. However, it should be understood that the following discussion may apply to mirror images of the articles of footwear that may be intended to be used with a left foot. For example, the features of a first left molding cavity may be substantially similar to the first molding cavity 202 and a second left molding cavity may be substantially similar to a second molding cavity 292 (FIG. 10).

Figure 3:
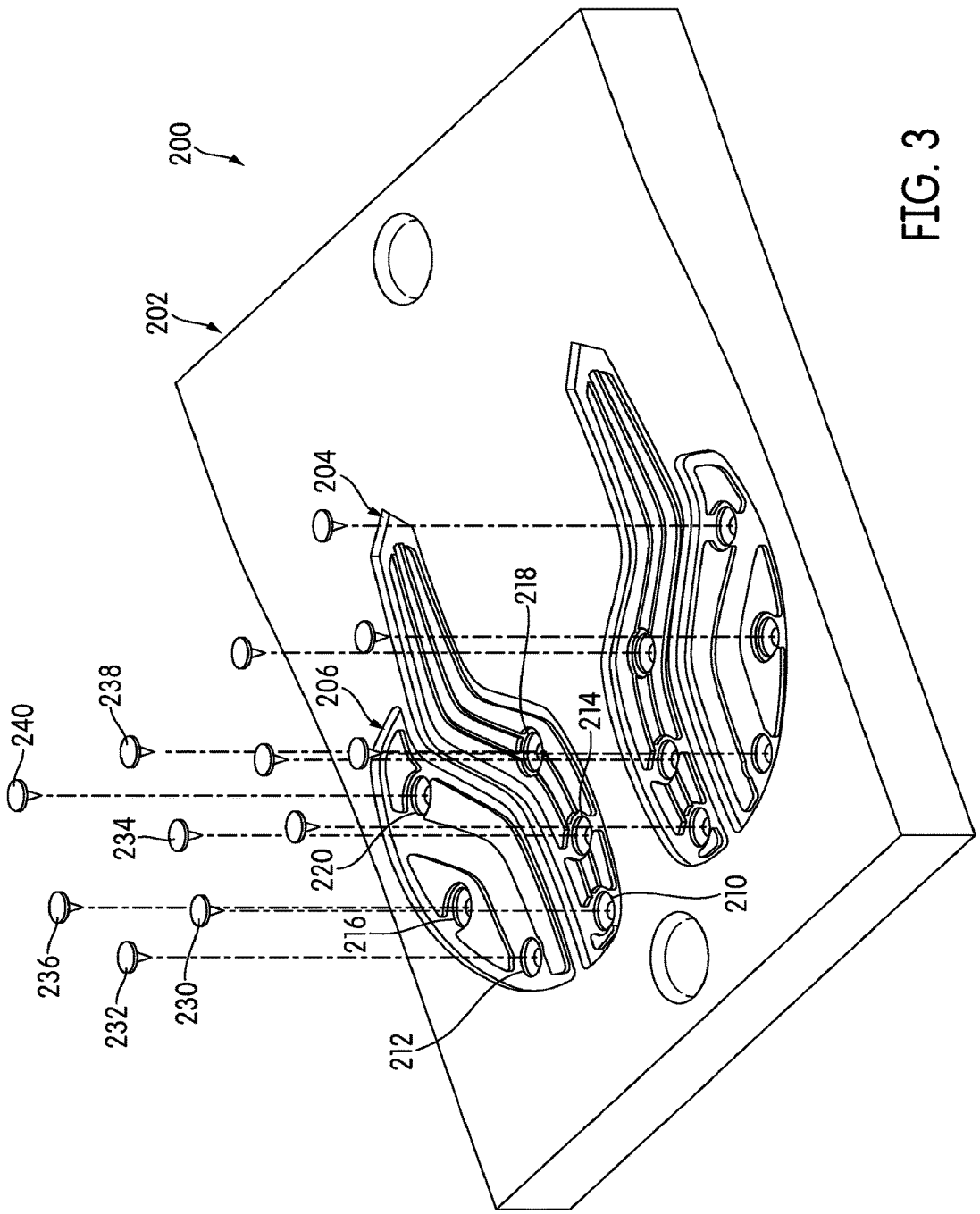
FIG. 3 illustrates first cleats being placed into the first mold half of FIG. 2.

As shown in FIG. 3, a first set of cleats is placed in the first set of cleat cavities and a second set of cleats is inserted into the second set of cleat cavities. In an exemplary configuration, the first set of cleats includes a first cleat 230, a third cleat 234, and a fifth cleat 238. Similarly, the second set of cleats may include a second cleat 232, a fourth cleat 236, and a sixth cleat 240. As noted above, in some configurations, a fastener element may be placed into the first set of cleat cavities and into the second set of cleat cavities.

Figure 4:
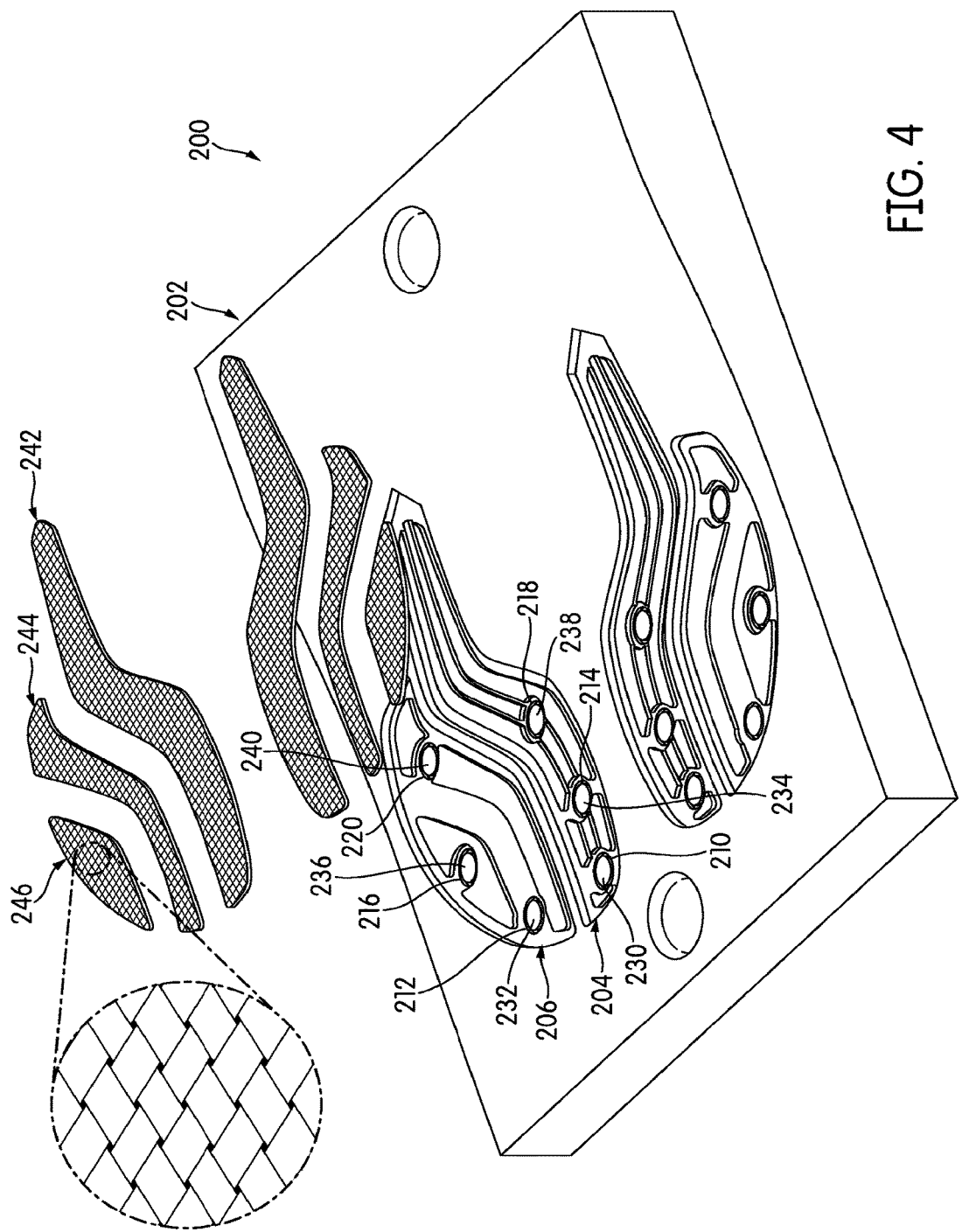
FIG. 4 illustrates first rigid members being placed into a second mold half of the molding system of FIG. 2.

Referring to FIG. 4, a schematic view of an exemplary configuration of the molding system 200 for the segmented plate (i.e., sole plate 102) is provided. As shown, a first rigid member or reinforcement member 242 of a first material is placed into the first region 204 and a second rigid member or reinforcement member 244 of a first material is placed into the second region 206 such that the first reinforcement member 242 is separated from the second reinforcement member 244 by a channel extending along a length of each member 242, 244. In other configurations, the first rigid member 242 and the second rigid member 244 are made of different materials and/or the first rigid member 242 and a third rigid member or reinforcement member 246 are made of different materials. As shown, the second rigid member 244 and the third rigid member 246 form separate pieces. In other configurations, the second rigid member 244 and the third rigid member 246 are monolithic (not shown).

In some configurations, the first material is a rigid material, including a rigid woven fabric. In one configuration, the rigid material may include carbon fiber, as well as other materials. In various configurations, the rigid material includes a woven fabric such as a carbon fiber, nylon fiber, cotton fiber, textile, elastomer fiber, animal fiber, and the like. In some configurations, the rigid material is a substance having a high Young's modulus. For example, a high Young's modulus may be greater than 100 gigapascal (GPa), greater than 150 GPa, greater than 180 GPa, greater than 200 GPa, etc. Examples of rigid materials having a high Young's modulus may include, for instance, copper, brass, bronze, steel, silicon carbide, tungsten carbide, and a single-walled carbon nanotube, as well as other materials. The rigid material can comprise carbon fiber. The rigid material can consist essentially of carbon fiber.

In one configuration, the first rigid member 242, the second rigid member 244, and/or the third rigid member 246 may use one or more features of Auger et al. (U.S. Pat. No. 7,832,117), the entire disclosure of which is incorporated herein by reference. In some configurations, one or more methods of Auger et al. may be used to construct the first rigid member 242, the second rigid member 244, and/or the third rigid member 246.

As noted above, in some configurations, the first material is a rigid woven fabric. For example, FIG. 4 illustrates a particular weave of the rigid, woven fabric. The weave of the rigid, woven fabric may utilize different shapes including, but not limited to, hexagonal, cylindrical, conical, circular, square, rectangular, trapezoidal, diamond, ovoid, as well as other regular or irregular and geometric or non-geometric shapes.

In some configurations, the rigid, woven fabric uses carbon fibers. In other configurations the rigid, woven fabric is uses other fibers, such as animal-based fibers, plant based fibers, mineral based fibers, synthetic fibers, etc. In some configurations, synthetic fibers include nylon, thermoplastic, aramid, acrylic, and the like.

Figure 5:
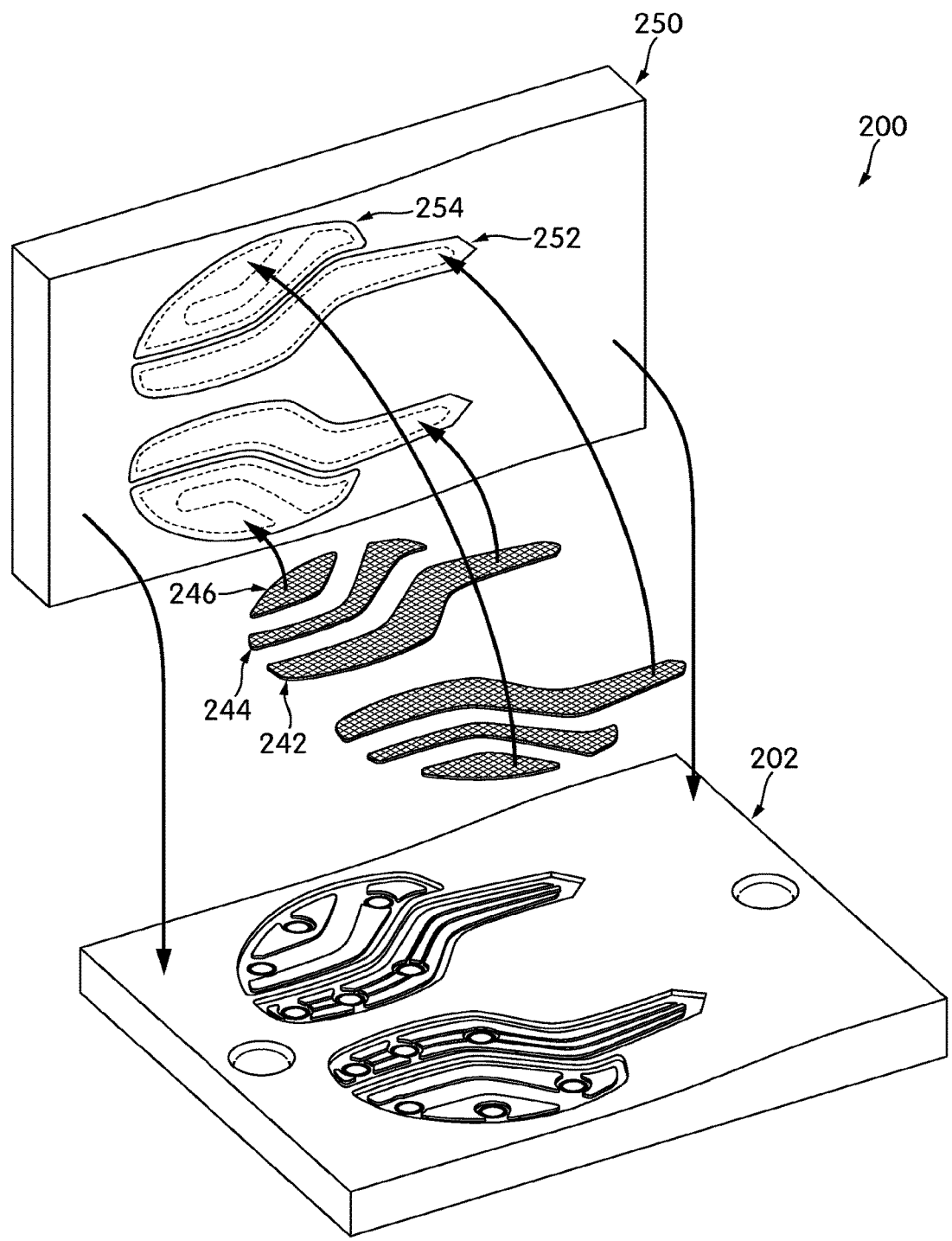
FIG. 5 illustrates the second mold half being placed onto the first mold half of FIG. 2.

FIG. 5 illustrates a first molding top or second mold half 250 of the molding system 200. The second mold half 250 cooperates with the first mold half 202 to define a mold of the molding system 200 and, further, cooperates with the first mold half 202 to define a shape of the plates 106, 108 by defining cavities between the first mold half 202 and the second mold half 250 that respectively have the shapes of the plates 106, 108. As shown, the first rigid member 242 attaches to a first portion 252 corresponding to the first region 204. Similarly, as shown in FIG. 5, the second rigid member 244 attaches to a second portion 254 corresponding to the second region 206 and the third rigid member 246 attaches to the second portion 254 corresponding to the second region 206. For example, a releasable adhesive may be used to attach the first rigid member 242 to the first portion 252, the second rigid member 244 to the second portion 254, and/or the third rigid member 246 to the second portion 254.

Figure 6:
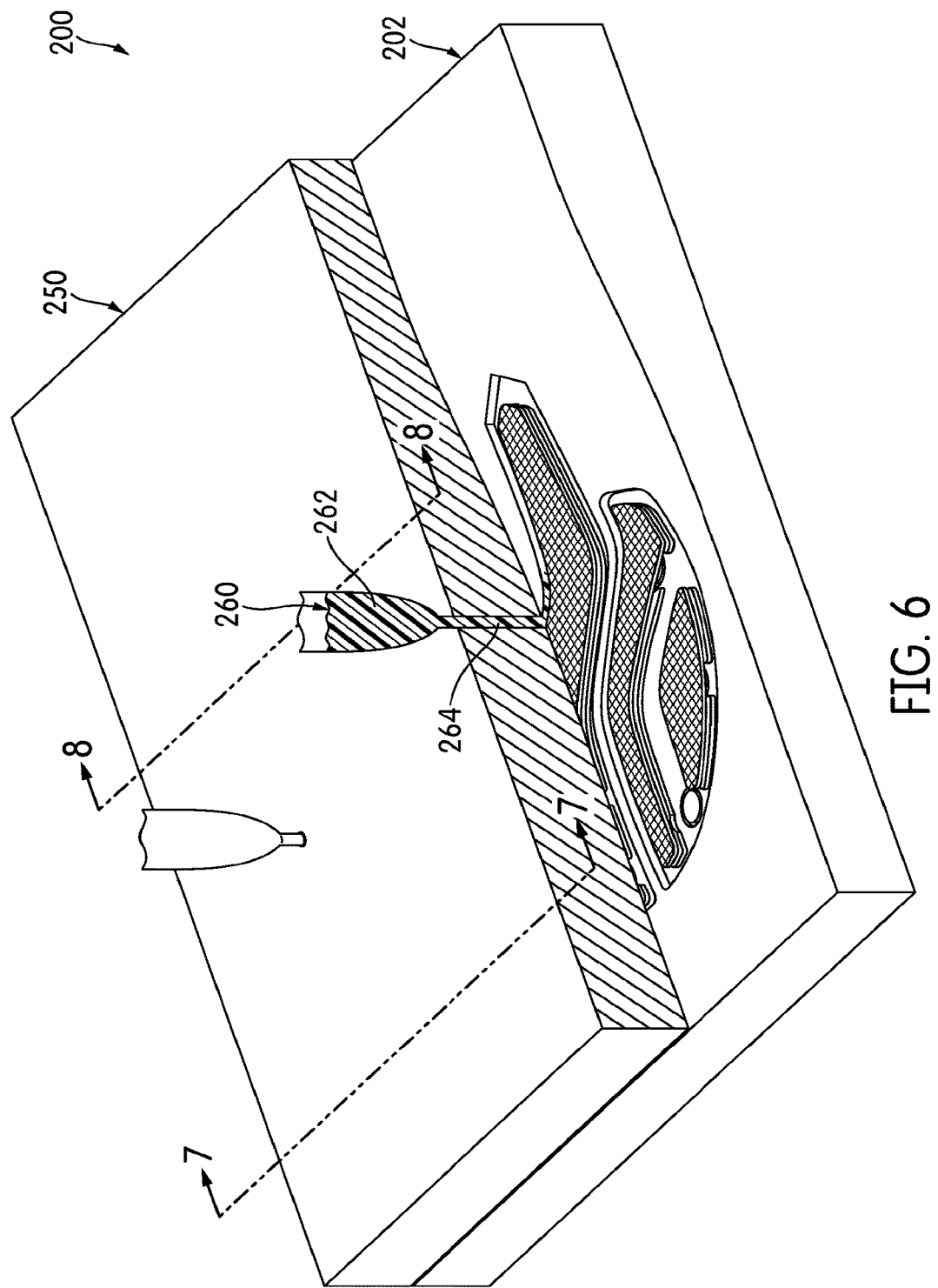
FIG. 6 is a perspective view of the first mold half of FIG. 2 with a part of a second mold half removed to show a material being injected into an area between the first mold half and the second mold half.

As shown in FIG. 6, the second material 260 may be introduced into the molding system 200 through an injection cavity 262. In this configuration, the second material 260 passes through an orifice 264 into the first region 204 and into the second region 206. In one configuration, the injection cavity 262 may include an injection tip (not shown) that protrudes from the molding system 200. In some configurations, the injection cavity 262 may be in fluid communication with first molding cavity 202 via the orifice 264. With this arrangement, the orifice 264 allows a liquid or viscous substance to pass through the injection cavity 262 into the first molding cavity 202. In FIG. 6, only one injection cavity and orifice are shown. In other configurations, however, the molding system 200 may include additional injection cavities with corresponding orifices.

In one configuration, the second material 260 may be formed of an elastomer. For example, the elastomer may be a thermoplastic rubber, a thermoplastic elastomer (TPE) such as polyether block amide (PEBAX), and the like. In some configurations, the second material 260 may include, but is not limited to, any one or more of the following materials: natural or synthetic rubber, hard foam, plastics, polymers, nylon, polyurethane, thermoplastic polyurethane (TPU), as well as any other deformable or rigid materials. However, it will be understood that any other materials could be used as the second material 260. In addition, in some configurations, a segmented plate may be produced using more than one second material 260 and/or other materials.

Figure 7:
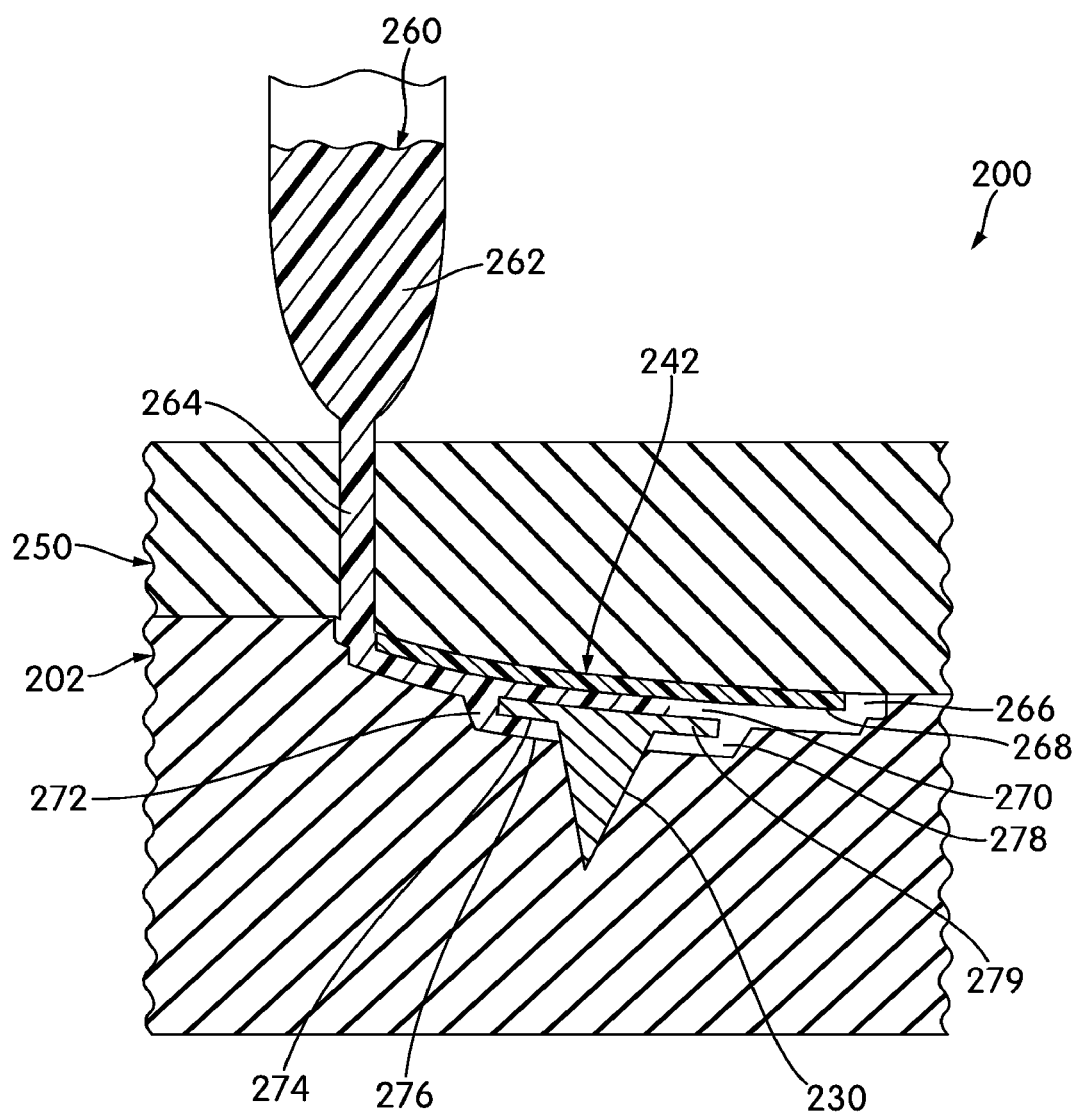
FIG. 7 is a cross-sectional view of one of the cleats of FIG. 2 during a molding step.

FIG. 7 illustrates different views of an exemplary configuration of a first cleat 230 made using the molding system 200. In some cases, a plurality of cleat members may be made in a substantially similar manner as the first cleat 230. For example, the second cleat 232, the third cleat 234, the fourth cleat 236, the fifth cleat 238, and the sixth cleat 240 may be formed as shown in FIG. 7. In other cases, other types of cleat members may be configured in a different manner. For example, the second cleat 232 may be provided by use of a receiving member (not shown) configured to receive a cleat member.

In one configuration, the second material 260 passes through the orifice 264 into an upper cavity 266, into a first lower cavity 272, and into a second lower cavity 278. As shown, the upper cavity or gap 266 is located between a lower surface 268 of the first rigid member 242 and an upper surface 270 of a flange 279 of the first cleat 230. Moreover, the first lower cavity or gap 272 is located between a lower surface 274 of the flange 279 and an upper surface 276 of the first molding cavity 202. Similarly, the second lower cavity or gap 278 is located between the lower surface 274 of the flange 279 and the upper surface 276 of the first molding cavity 202.

Figure 13:
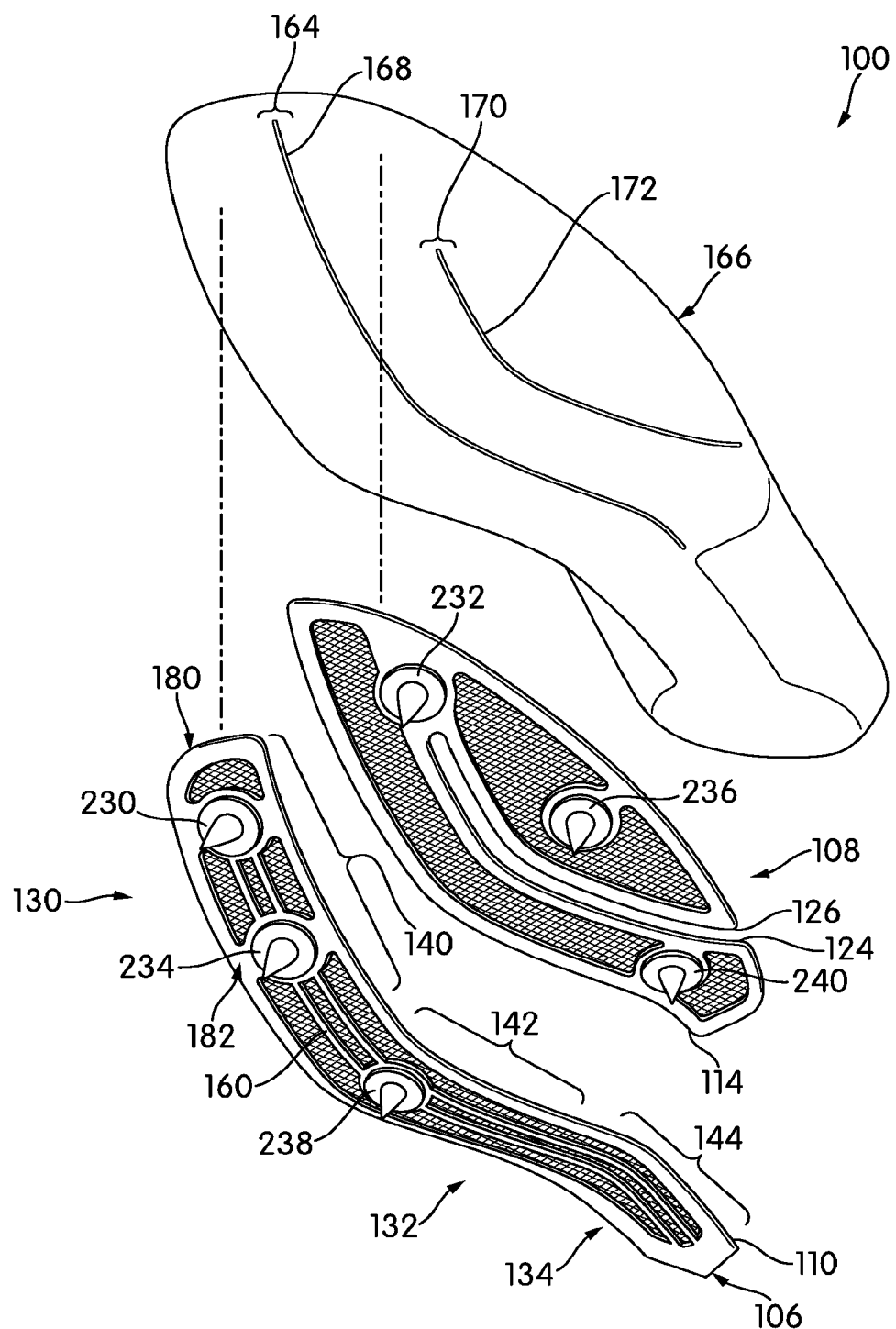
FIG. 13 is a partial exploded view of the first article of footwear of FIG. 12.

The second material 260 is shown in FIG. 7 as beginning to fill the upper cavity 266, the first lower cavity 272, and the second lower cavity 278. In an exemplary configuration, the second material 260 substantially fills the upper cavity 266, the first lower cavity 272, and the second lower cavity 278. The second material 260 may similarly fill the remainder of the first region 204 and the second material 260 may similarly fill the second region 206. In short, the second material 260 substantially fills the first region 204 and/or second material 260 substantially fills the first region 204 to form the plate members 106, 108. Namely, the second material 260 may bond to the rigid members or reinforcement members 242-246 and to the cleats 230-240 to fix a position of the reinforcement members 242-246 and the cleats 230-240 relative to one another, thereby forming the sole plate 102. For example, the second material 260 may surround a portion of each cleat 230-240 and may extend over edges of each reinforcement member 242-246 to join the cleats 230-240 to the respective reinforcement members 242-246 (FIG. 7), thereby forming the plates 106, 108 that make up the sole plate 102. The sole plates 106, 108 may be individually attached to the article 100 at a midsole of the article 100 (FIG. 13).

In an exemplary configuration, the upper cavity 266, the first lower cavity 272, and the second lower cavity 278 may be generally disc shaped. In other configurations, the upper cavity 266, the first lower cavity 272, and the second lower cavity 278 may correspond to different shapes associated with a cleat including, but not limited to, hexagonal, square, rectangular, trapezoidal, diamond, circular, ovoid, as well as other regular or irregular and geometric or non-geometric shapes.

In some configurations, the first rigid member 242 is spaced apart from the first cleat 230 by a gap (i.e., defined generally by the upper cavity 266 in FIG. 7). For example, and as shown in FIG. 7, the first rigid member 242 is separated from the first cleat 230 by the second material 260 once the second material 260 is injected into the cavity. In some instances, such spacing allows the second material 260 to bond to the first rigid member 242 and to the first cleat 230 in an area between the first rigid member 242 and the first cleat 230.

In one configuration, the second material 260 directly contacts the first cleat 230 and the second material 260 directly contacts the first rigid member 242. For example, and as shown in FIG. 7, the second material 260 directly contacts the upper surface 270 of the first cleat 230 and the second material 260 directly contacts the lower surface 268 of the first rigid member 242. Similarly, the second material 260 may directly contact an upper surface of the second cleat 232 and the second material 260 may directly contact a lower surface of the second rigid member 244.

Figure 8:
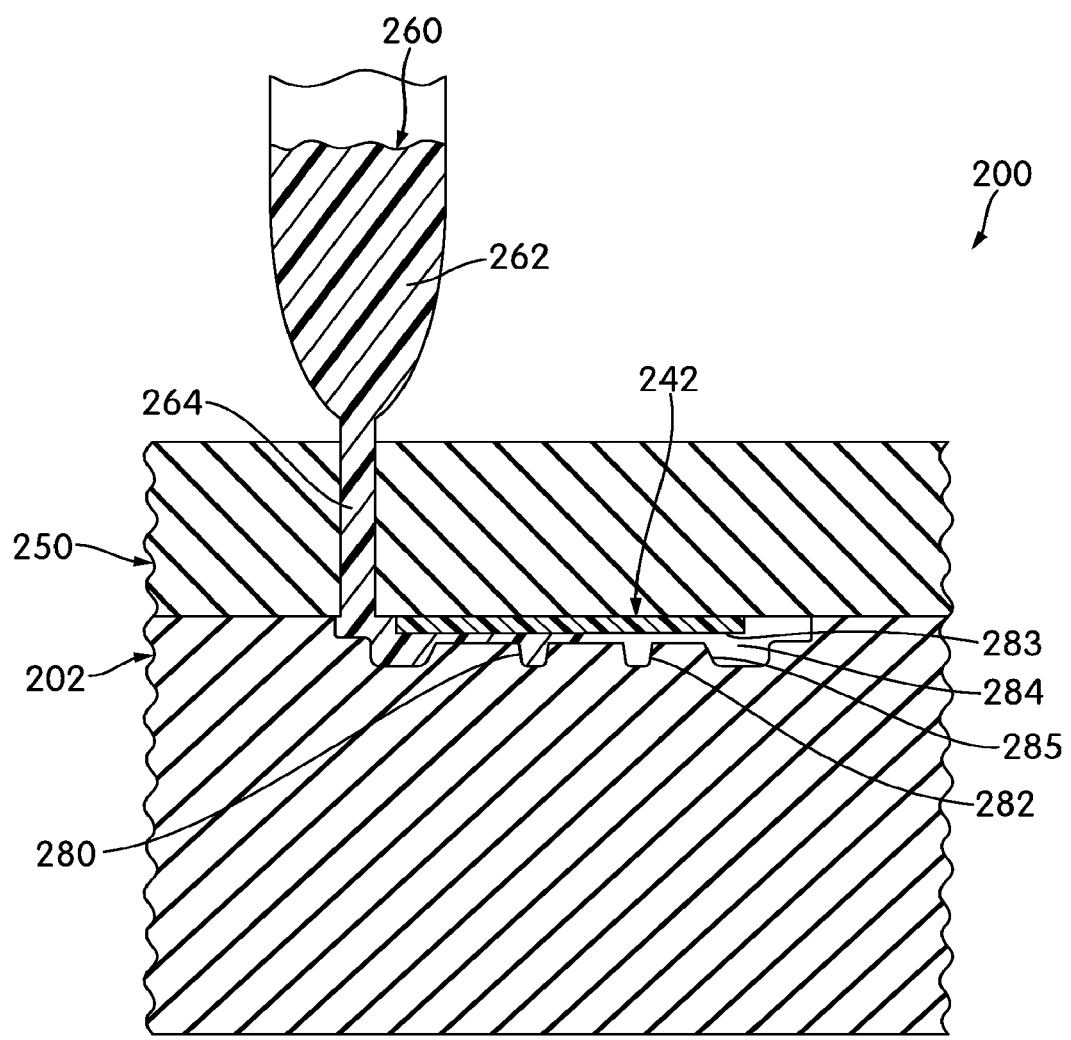
FIG. 8 is a cross-sectional view of one of the first rigid members during a molding step.

FIG. 8 illustrates a cross-sectional view of formation of the first plate member 106. As shown, FIG. 8 illustrates formation of a first rib 280 and a second rib 282. In some configurations, the second rib 282 is omitted. In other configurations, additional ribs are included. For instance, the first plate member 106 may include a third rib, a third rib and a forth rib, etc.

In one configuration, the second material 260 passes through the orifice 264 into a rib cavity 284. As shown, the rib cavity 284 is located between a lower surface 283 of the first rigid member 242 and an upper surface 285 of the first molding cavity 202. FIG. 8 shows the second material 260 beginning to fill the rib cavity 284. In an exemplary configuration, the second material 260 substantially fills the rib cavity 284 to form the ribs 280, 282.

In an exemplary configuration, the first molding top (second mold half) 250 is removed from the first molding cavity (first mold half) 202. In some instances, the second material 260 is bonded to the first cleat 230, the third cleat 234, and the fifth cleat 238, and the second material 260 is bonded to the second cleat 232, the fourth cleat 236, and the sixth cleat 240. Additionally, the use of a releasable adhesive may further allow the first rigid member 242 to decouple from the first molding top 250 and the use of the releasable adhesive may also allow the second rigid member 244 to decouple from the first molding top 250 after molding.

Figure 9:
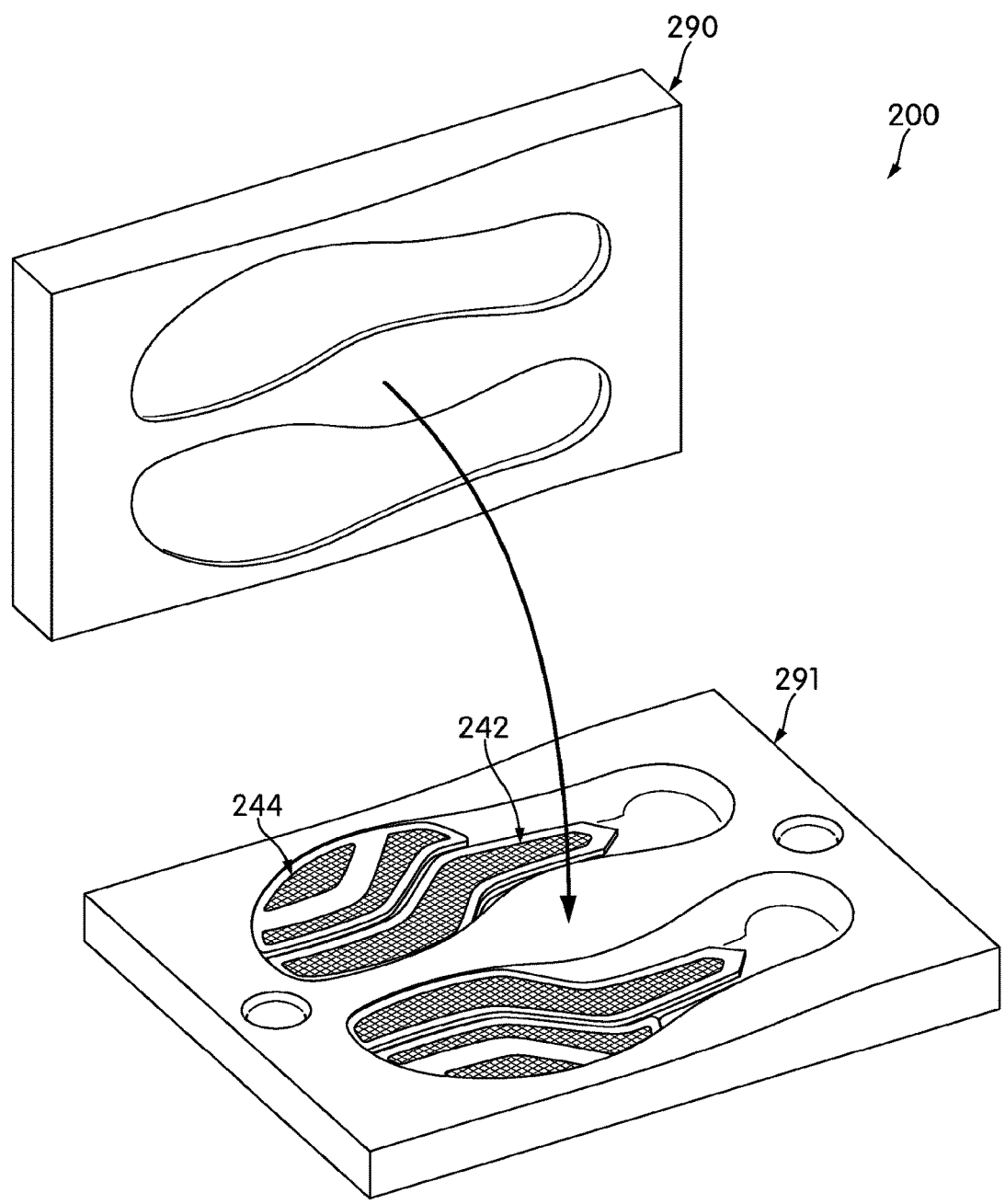
FIG. 9 is a perspective view of a third mold half being placed on the first mold half of FIG. 2.

As shown in FIG. 9, a second molding top (third mold half) 290 is placed onto a resulting cavity of the molding system 200. In one configuration, the first plate member 106 and the second plate member 108 form a second molding cavity 291 along with the cavity of the first molding cavity (first mold half) 202. Namely, portions of the reinforcement members 242-246 are exposed in the first mold half 202, oppose the third mold half 290, and receive a third material, as described below and shown in FIG. 11. Hereinafter, cooperation amongst the first plate member 106, the second plate member 108, and the remaining exposed portions of the first molding cavity 202 (i.e., the portions of the first molding cavity 202 that surround the formed plate members 106, 108) will be identified as second molding cavity 291. In operation, the second molding top 290 is placed onto the molding system 200 (i.e., onto the first mold half 202) to define the second molding cavity 291 therebetween. As such, an upper surface of the first plate member 106 and an upper surface of the second plate member 108 may be used to form a portion of the second molding cavity 291.

As shown in FIG. 10, a third material 298 may be introduced into the molding system 200 through an injection cavity 294. In one configuration, the third material 298 is the same as the second material 260. In other configurations, the third material 298 is different than the second material 260. For example, the second material 260 is PEBAX and the third material 298 is a foamed material, whereby the foamed material is more flexible than the second material 260.

In some configurations, the third material 298 is a substance having a low Young's modulus. For example, a low Young's modulus may be less than 100 GPa, less than 50 GPa, less than 25 GPa, etc. Examples of a third material 298 may include, for instance, an expanded rubber, foam rubber, polyurethane, as well as other materials.

In some configurations, the third material 298 is less rigid than the second material 260. For example, the third material 298 has a Young's modulus that is less than a Young's modulus of the second material 260. In another example, the third material 298 has a Young's modulus that is less than a Young's modulus of the second material 260 by at least 300 GPa, 200 GPa, 100 GPa, 50 GPa, or 25 GPa.

In one configuration, the third material 298 passes through an orifice 296 into the first region 204 and the third material 298 also passes through the orifice 296 into the second region 206. As shown, the first plate member 106 and the second plate member 108 serve as an upper surface of the second molding cavity 291.

In some configurations, the second material and the third material may be different materials and/or may have different properties. In some configurations, the second material may be more rigid than the third material. For example, the second material may be chosen from a substantially rigid material so as to provide a durable element for a plate member. Similarly, the third material may be chosen from a substantially deformable material so as to soften an effect of an impact on a ground-engaging portion of a cleat member. In an exemplary configuration, the second material and the third material may be configured to bond to each other to form an article of footwear.

Figure 11:
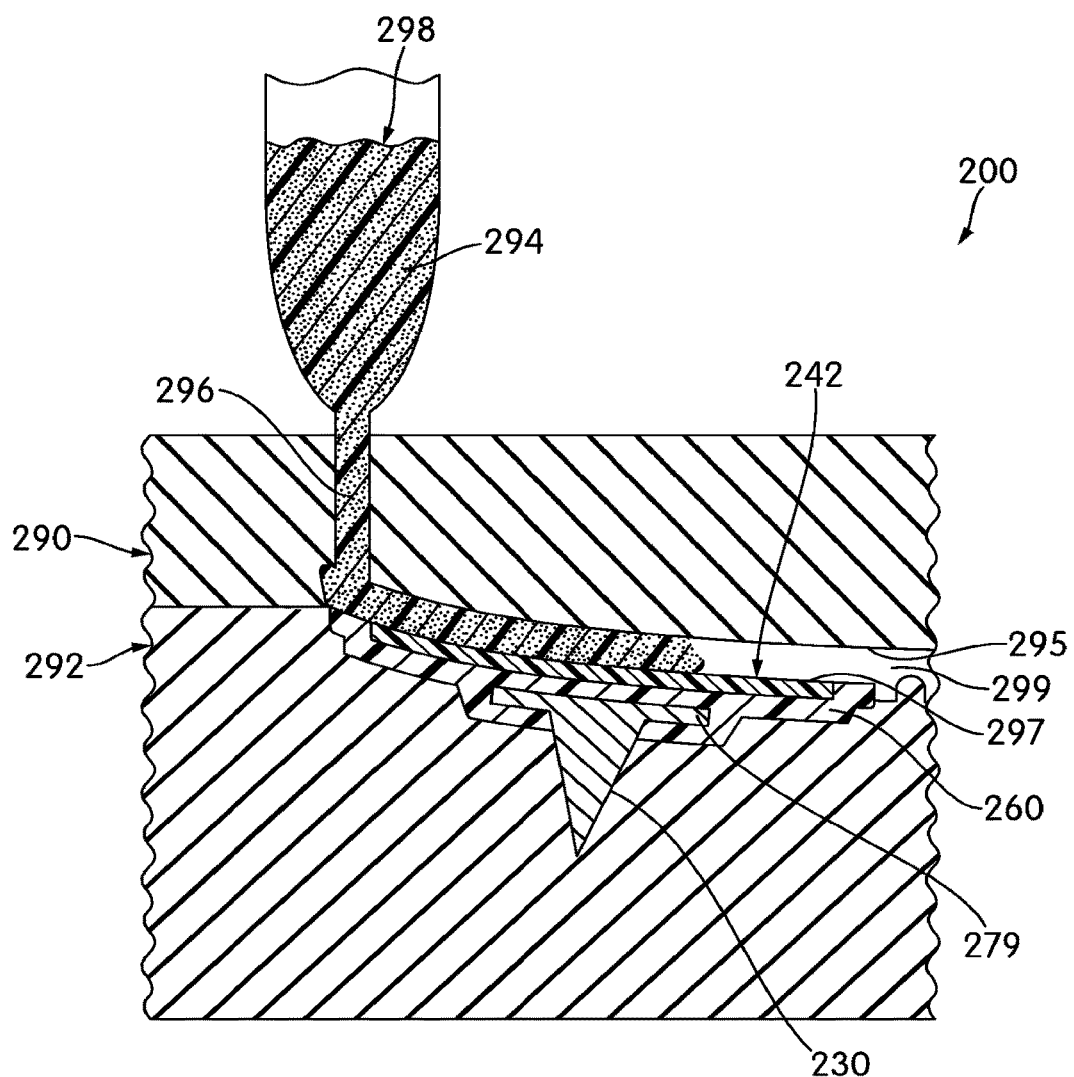
FIG. 11 is a cross-sectional view of one of the first cleats during injection of a material into an area between the first mold half and the third mold half.

FIG. 11 illustrates a cross-sectional view of the first cleat 230. In one configuration, the third material 298 passes through orifice 264 into a midsole cavity 299. As shown, the midsole cavity 299 is located between a lower surface 295 of the second molding top (i.e., third mold half) 290 and an upper surface 297 of the first rigid member 242. Accordingly, a top surface of the first rigid member 242 that opposes the lower surface 295 of the second molding top 290 receives the third material 298 and, as such, acts as a mold surface. FIG. 11 shows the third material 298 as beginning to fill the midsole cavity 299. In an exemplary configuration, the third material 298 substantially fills the midsole cavity 299 and forms a midsole of the article 100 (FIG. 11).

Figure 12:
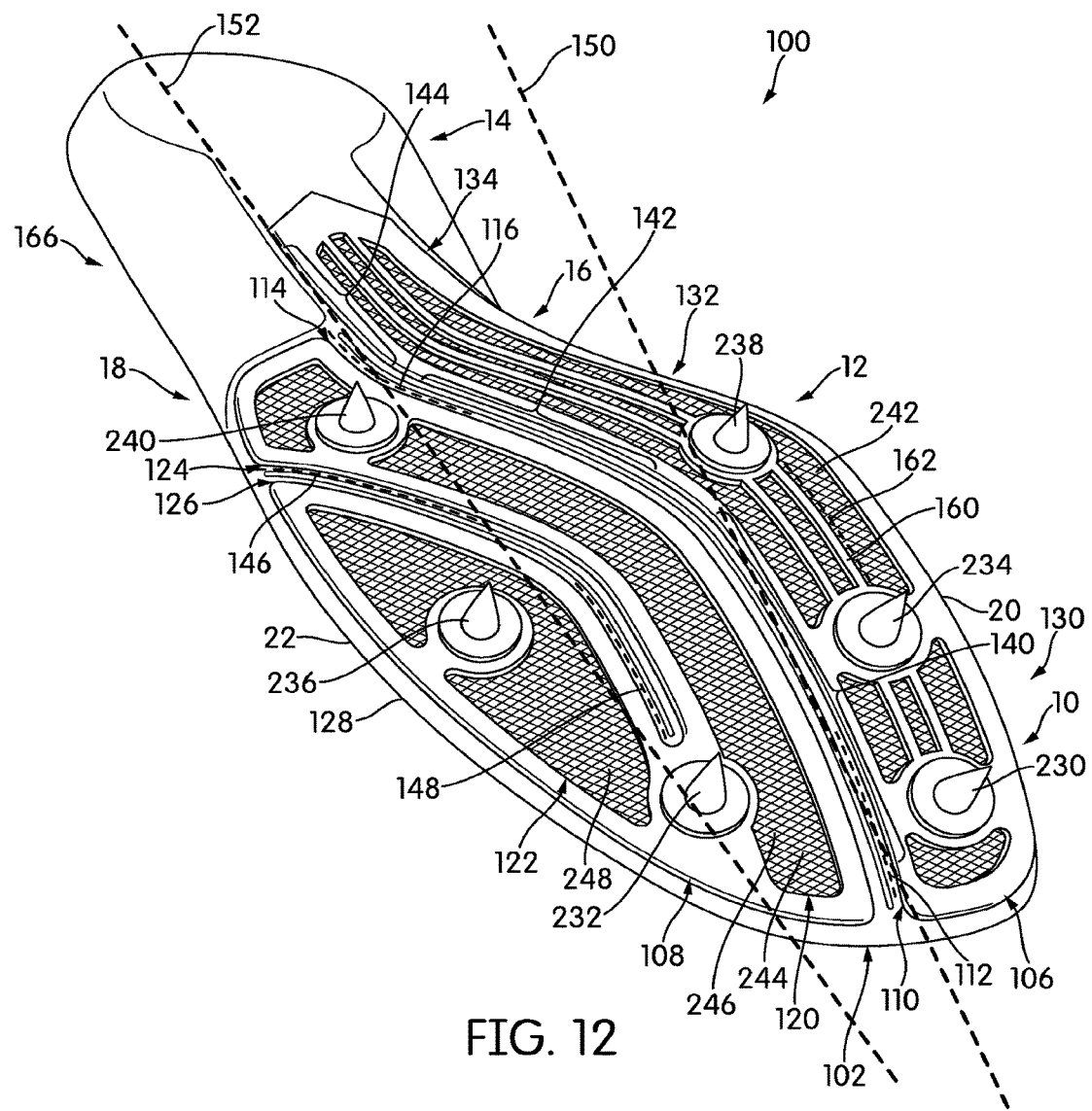
FIG. 12 is an isometric view of a resulting first article of footwear in accordance with the principles of the present disclosure.

FIG. 12 illustrates a bottom view of the article 100 including the sole plate 102. The sole plate 102 may include a forefoot region disposed proximate a wearer's forefoot. For example, the sole plate 102 may include a forefoot portion 10. The sole plate 102 may include a heel region disposed proximate a wearer's heel and opposite the forefoot region. For example, the sole plate 102 may include a heel portion 14. The sole plate 102 may include a midfoot region disposed between the forefoot region and the heel region. For example, the sole plate 102 may include a midfoot portion 12. The sole plate 102 may include a medial side and a lateral side opposite the medial side. For example, the sole plate 102 may include a medial side 16 and a lateral side 18. The sole plate 102 may include a medial edge 20 on the medial side 16 and a lateral edge 22 on the lateral side 18.

As shown in FIG. 12, the first plate member 106 has a first edge 110 including a first contour 112. Moreover, FIG. 12 shows the second plate member 108 including a second edge 114 having a second contour 116. As shown, the first contour 112 has a contour substantially corresponding to the second contour 116.

In some cases, even flexibility in the lateral direction compared to the longitudinal direction is desired. In some configurations, the second plate member 108 further includes a central portion 120 and a lateral portion 122. For example, and as shown in FIG. 12, the central portion 120 includes the second edge 114 and further includes a third edge 124. Additionally, FIG. 12 shows the lateral portion 122 includes a fourth edge 126 and a fifth edge 128. As such, the first edge 110, the second edge 114, the third edge 124, and the fourth edge 126 allow the first plate member 106, the central portion 120, and the lateral portion 122 to flex in the lateral direction by allowing these elements 106, 120, 122 to at least partially move relative to one another.

In one example, the first plate member 106 includes a forefoot region 130, a transition region 132, and a midfoot region 134. For instance, the transition region 132 may extend between the forefoot region 130 and the midfoot region 134. Additionally, the midfoot region 134 may extend from lateral edge 22 to medial edge 20. Moreover, the forefoot region 130 may extend from first edge 110 to the medial edge 20. Further, the transition region 132 may extend from first edge 110 to the medial edge 20 and/or the second plate member 108 may extend from the lateral edge 22 to the second edge 114.

In some cases, the article 100 is provided with even further flexibility in the lateral direction compared to the longitudinal direction. As shown in FIG. 12, the first edge 110 includes a forefoot segment 140, a transition segment 142, and a midfoot segment 144. As previously noted, the first edge 110 has a first contour 112. In some configurations the second edge 114 has a second contour 116 that substantially corresponds to the first contour 112. Similarly, in some configurations the third edge 124 has a third contour 146 that substantially corresponds to the first contour 112. Moreover, in some configurations the fourth edge 126 has a fourth contour 148 that substantially corresponds to the first contour 112. As such, the first edge 110, the second edge 114, the third edge 124, and the fourth edge 126 allow the first plate member 106, the central portion 120, and the lateral portion 122 to flex in the lateral direction.

In some cases, the forefoot segment 140 extends along a medial axis 150 extending in a substantially longitudinal direction along the medial side 16 of the article 100. For example, and as shown in FIG. 12, the forefoot segment 140 extends along medial axis 150.

In some cases, the midfoot segment 144 extends along a lateral axis 152 extending in a substantially longitudinal direction along the lateral side 18 of the article 100. For example, and as shown in FIG. 12, the forefoot segment 140 extends along the lateral axis 152.

As shown in FIGS. 12-13, in order to improve a lateral flexing of the article of footwear 100, the first material may have a shape corresponding to a shape of a plate member. For example, as shown in FIG. 12, the first rigid member 242 extends along the first contour 112 and the first rigid member 242 maintains a substantially constant first distance from the first edge 110. Likewise, the second rigid member 244 extends along the second contour 116 and the second rigid member 244 maintains a substantially constant second distance from the second edge 114. Moreover, the third rigid member 246 extends along the fourth contour 148 and the third rigid member 246 maintains a substantially constant third distance from the fourth edge 126. Additionally, in some configurations, the second rigid member 244 extends along the third contour 146 and the second rigid member 244 maintains a substantially constant fourth distance from the third edge 124.

In some configurations, the article 100 includes a rib. For example, as shown in FIG. 12, rib 160 has a rib contour 162 to allow additional lateral flexibility. In some configurations, the rib 160 has a rib contour 162 corresponding to a shape of the first plate member 106. In other configurations, the rib 160 has a rib contour 162 different from the shape of the first plate member 106. For example, the rib 160 may crisscross across the first plate member 106 (not shown). As such, the rib 160 and the first plate member 106 may allow the first plate member 106 and the rib 160 to flex in the lateral direction.

As shown in FIG. 13, in some instances, a portion 164 of the midsole 166 extending between the first edge 110 and the second edge 114 may be exposed. For instance, as shown in FIG. 13, the portion 164 is exposed to allow the first plate member 106 and the second plate member 108 to elastically move relative to each other. Moreover, the portion 164 may include a notch 168. In some configurations the notch 168 has a shape corresponding to a shape of the portion 164 of the midsole.

In some instances, a portion 170 of the midsole 166 extends between the third edge 124 and the fourth edge 126 may be exposed. For instance, as shown in FIG. 13, the portion 170 is exposed to provide a gap between the central portion 120 and the lateral portion 122 to allow the central portion 120 and the lateral portion 122 to elastically move relative to each other. Moreover, the portion 170 may include a notch 172. In some configurations the notch 172 has a shape corresponding to a shape of the portion 170 of the midsole 166. For instance, the shape as illustrated in FIG. 12.

As shown in FIG. 13, the sole plate 102 may have a top surface and a bottom surface. For example, referring to FIG. 13, the sole plate 102 may include a top surface 180 and a bottom surface 182. The sole plate 102 may be configured to be attached to an upper (e.g., 104). The sole plate 102 may also be configured to be attached to the midsole 166 or an insole of an article of footwear (e.g., article 100). The top surface 180 may be configured to contact the midsole 166 or the insole. The bottom surface 182 may be configured to contact a playing surface. For example, the bottom surface 182 may be configured to contact grass, synthetic turf, dirt, and/or sand. The bottom surface 182 may include provisions for increasing traction with such a playing surface. For example, as shown in FIGS. 12 and 13, such provisions may include cleats. Additional cleats (not shown) may be disposed on the heel portion 14 of sole plate 102 and/or on the midfoot portion 12 of the sole plate 102.

In some configurations, the upper 104 may be attached to the sole plate 102 by any known mechanism or method. For example, the upper 104 may be stitched to the sole plate 102 or the upper 104 may be glued to the sole plate 102. The upper may be configured to receive a foot. The exemplary configuration shows a generic design for the upper 104. In some configurations, the upper 104 may include another type of design. For instance, the upper 104 may be a seamless warp knit tube of mesh. As shown, the sole plate 102 includes the first plate member 106 and the second plate member 108.

Figure 14:
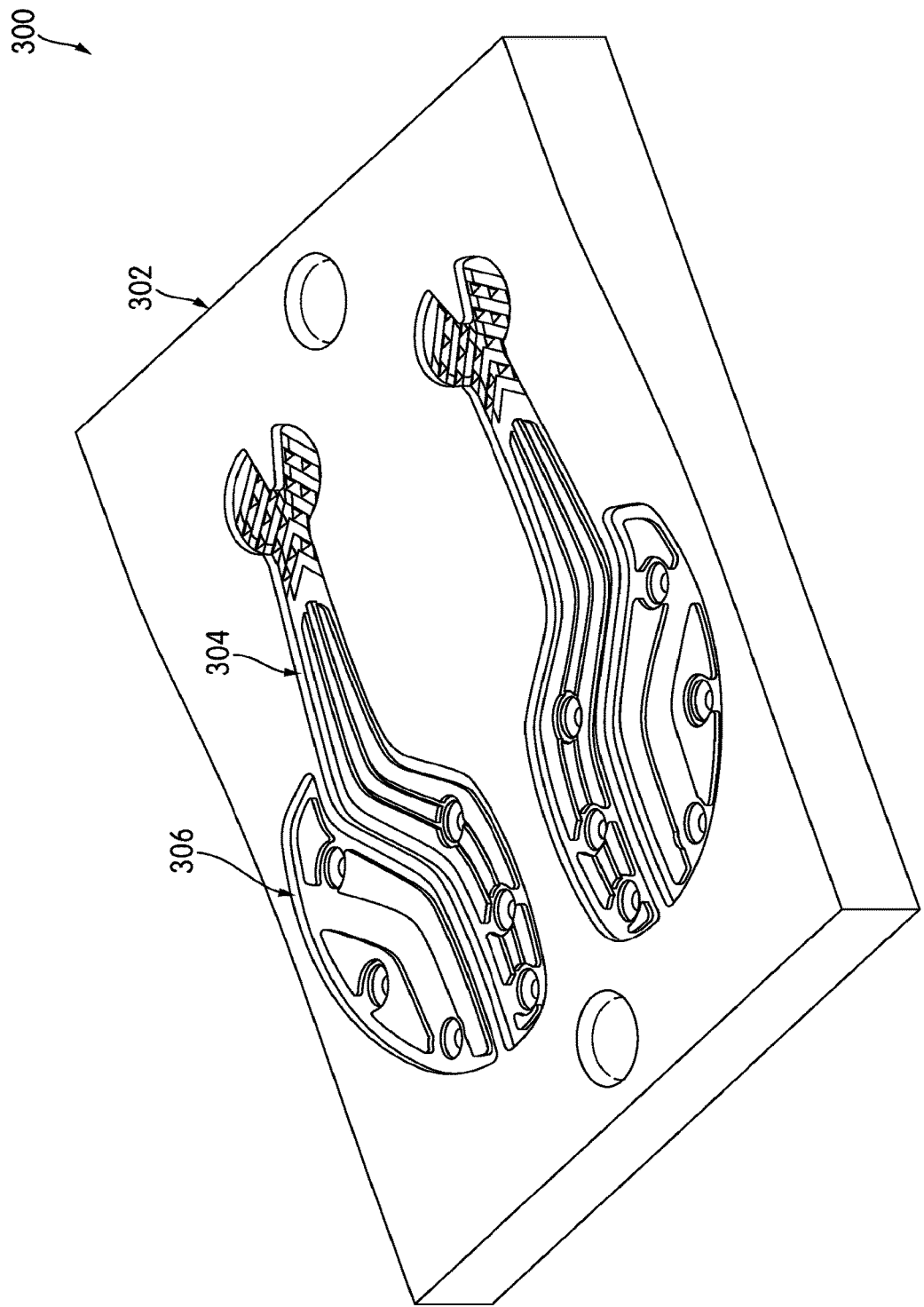
FIG. 14 is a perspective view of a first mold half of a molding system in accordance with the principles of the present disclosure.
Figure 15:
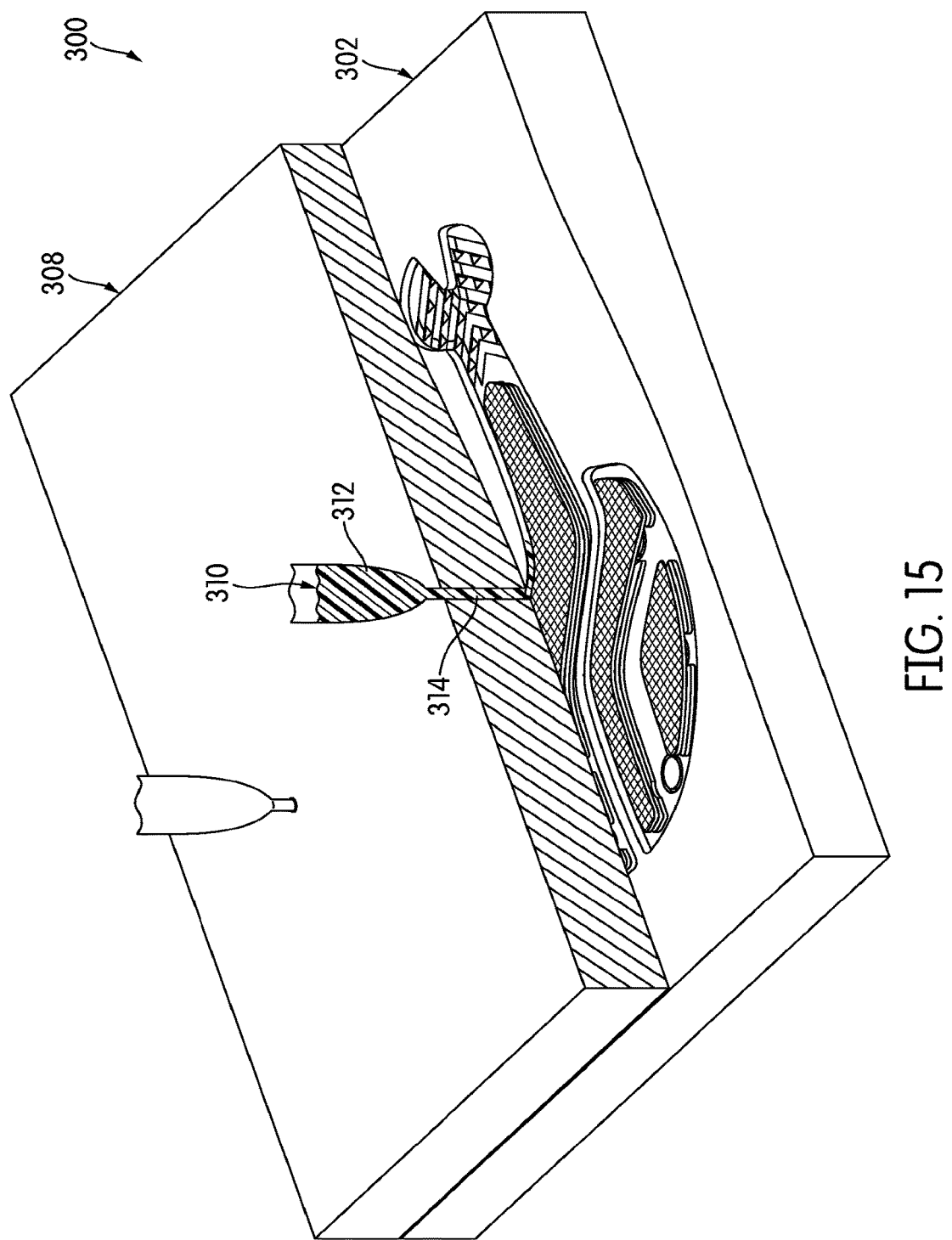
FIG. 15 is a perspective view of the first mold half of FIG. 14 with part of a second mold half removed to show injection of a material into an area between the first mold half and the second mold half.

FIG. 14 illustrates a molding system 300 similar to molding system 200 except that the molding system 300 includes a heel molding cavity or first mold half 302 having a first heel molding region 304 and a second heel molding region 306. As shown in FIGS. 14-15, the second heel molding region 306 may be substantially similar to the second region 206. In other configurations, the second heel molding region 306 is different than the second region 206.

In some configurations, the molding system 300 may include provisions for making a matched pair of segmented plates. In an exemplary configuration, separate plate cavities may be used to form a segmented plate associated with a right foot and a segmented plate associated with a left foot. In other configurations, a single plate cavity may be used to form the segmented plates. In yet other configurations, a single plate cavity may include one or more plate cavities used to form cleated plate members associated with either foot.

In some configurations, the presented method of forming a sole plate with molding system 300 may use steps that are substantially similar to those steps illustrated in FIGS. 3-5 for molding system 200. For instance, cleats may be placed into the first heel molding region 304 and the second heel molding region 306 similarly to the process illustrated in FIG. 3. In another example, the first material may be placed on a first heel molding top or second mold half 308 similarly to the placement of the first rigid member 242 onto the first molding top 250, as illustrated in FIGS. 4-5. In other configurations, the molding system 300 uses different steps and methods than the steps illustrated in FIGS. 3-5.

As shown in FIG. 15, the first heel molding top 308 may be placed onto the heel molding cavity 302 and second heel material 310 may be introduced into the molding system 300 through injection cavity 312. In this configuration, the second heel material 310 passes through an orifice 314 into the heel molding cavity 302. The second material 260 may be introduced to the heel molding cavity 302 to form a heel region 404 (see FIGS. 16-17).

In some configurations, the second heel material 310 is substantially similar to the second material 260. In other configurations, the second heel material 310 is different. For instance, a different kind of elastomer may be used, a color additive may be added, and the like.

Figure 16:
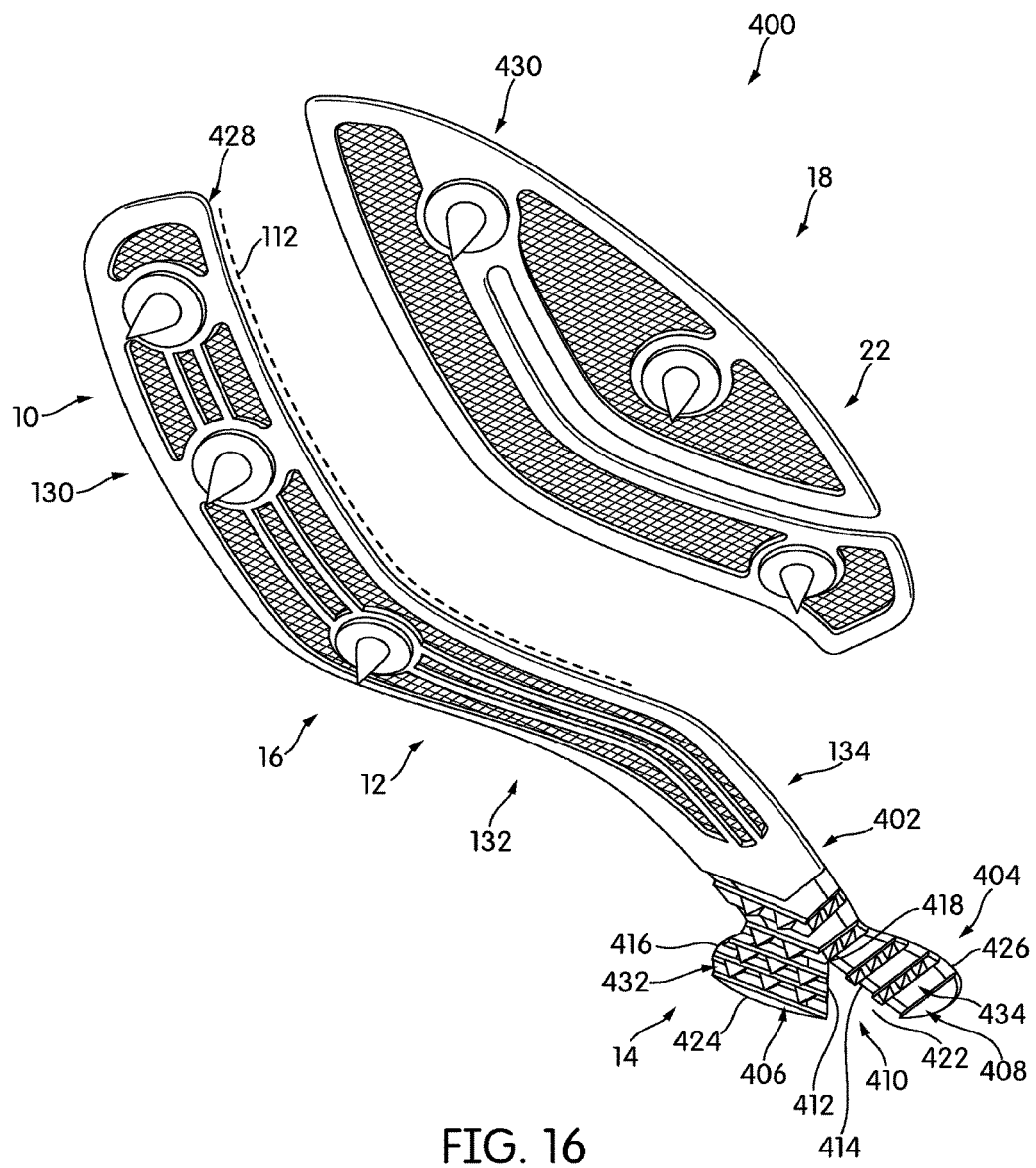
FIG. 16 is a bottom perspective view of a sole structure formed by the first mold half and the second mold half of FIG. 15.
Figure 17:
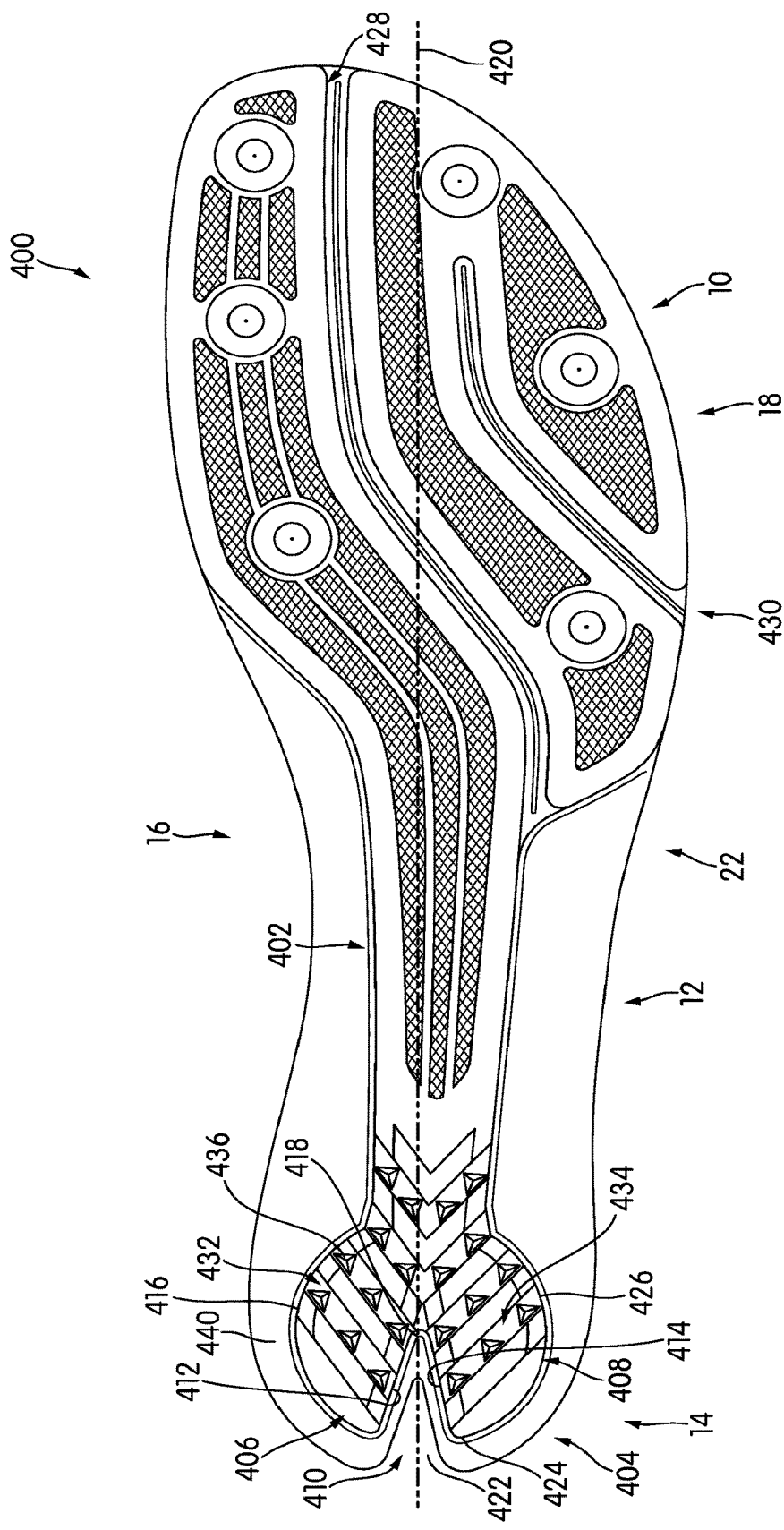
FIG. 17 is a bottom view of a second article of footwear incorporating the sole structure of FIG. 16.

FIGS. 16-17 illustrate an article of footwear 400, or simply article 400, resulting from the processes described in FIGS. 14-15. For example, as shown in FIGS. 16-17, the introduction of the second heel material 310 through orifice 314 may result in the first plate member 402 having a heel region 404 and a notch region 410.

As shown in FIGS. 16-17, the first plate member 402 may be substantially similar to the first plate member 106 except that the first plate member 402 further includes the heel region 404 and the notch region 410. As shown in FIG. 16, the heel region 404 may be integrally formed with the first plate member 402 and may extend from the first plate member 402. For example, as shown in FIGS. 16-17, the first plate member 402 includes the forefoot region 130, the transition region 132, and the midfoot region 134. Additionally, or alternatively, the first plate member 402 may have a similar contour as the first plate member 106. For example, as shown in FIG. 16, the first plate member 402 has a first edge 428 having the first contour 112.

In other configurations, the first plate member 402 is different than the first plate member 106. For example, the forefoot portion 10 of first plate member 402 is different than the forefoot portion 10 of the first plate member 106. In another example, the midfoot portion 12 of first plate member 402 is different than the midfoot portion 12 of the first plate member 106.

In some configurations, the article 400 further includes a second plate member 430. For example, as shown in FIGS. 16-17, the second plate member 430 is substantially similar to the second plate member 108. As shown, the second plate member 430 may include a different second plate member (not shown). In other configurations, the second plate member 430 may correspond to different shapes including but not limited to hexagonal, cylindrical, conical, circular, square, rectangular, trapezoidal, diamond, ovoid, as well as other regular or irregular and geometric or non-geometric shapes.

In some configurations, the heel region 404 includes a first heel region 406 and a second heel region 408. For example, as shown in FIGS. 16-17, the first heel region 406 extends towards the medial side 16 and the second heel region 408 extends towards the lateral side 18.

In one configuration, the notch region 410 separates the first heel region 406 and the second heel region 408. For example, as shown in FIGS. 16¬17 a medial edge 412 of the notch region 410 faces the second heel region 408 and a lateral edge 414 of the notch region 410 faces the first heel region 406.

In some configurations, the notch region 410 extends from an outer edge of the heel portion 14 toward the midfoot portion 12. For example, as shown in FIGS. 16-17, the notch region 410 extends from an exposed medial edge 416 to a notch tip 418. In one configuration, the notch tip 418 is positioned on a longitudinal axis. For example, as shown in FIG. 17, the notch tip 418 is positioned on the central axis 420.

In one configuration, the notch region 410 has a notch base 422 extending along an exposed heel edge 424. For example, as shown in FIGS. 16-17, the notch base 422 extends from the medial edge 412 to the lateral edge 414. In some configurations, the medial edge 412 and lateral edge 414 form a portion of the exposed heel edge 424. For example, as shown in FIGS. 16-17, the exposed heel edge 424 extends from the medial edge 412 to the notch tip 418.

In one configuration, the heel region 404 extends from outer edges of the heel region 14. For example, as shown in FIGS. 16-17, the first heel region 406 extends from an exposed medial edge 416 of the heel portion 14 to the medial edge 412 of the notch region 410. Similarly, as shown in FIGS. 16-17, the second heel region 408 extends from an exposed lateral edge 426 of the heel portion 14 to the lateral edge 414 of the notch region 410.

For example, as shown in FIG. 16, the heel region 404 is separated from a notch region 410. In one configuration, the heel region 404 may separate the notch region 410 from the lateral side 18 and/or the heel region 404 may separate the notch region 410 from the medial side 16. Similarly, the heel region 404 may separate the notch region 410 from the lateral edge 22 and/or the heel region 404 may separate the notch region 410 from the medial edge 20. In some configurations, the notch region 410 extends from an outer edge of the heel portion 14 towards the forefoot portion 10.

In some instances, traction elements may be included in the heel region 404. In an exemplary configuration, segment 432 includes a protrusion 434 corresponding to a pyramid shape as illustrated in FIGS. 16-17. In other configurations, protrusion 434 may correspond to different shapes including but not limited to hexagonal, cylindrical, conical, circular, square, rectangular, trapezoidal, diamond, ovoid, as well as other regular or irregular and geometric or non-geometric shapes. Such traction elements allow improved performance of the article 400 by allowing a better grip onto playing a surface.

In one configuration, the article 400 includes an upper. The upper may be similar to the upper 104. For example, the upper may be attached to the first plate member 402 similar to the attaching of the upper 104 to the sole plate 102. In another example, the upper and the upper 104 are formed of similar materials.

As shown in FIG. 17, in some configurations, the article 400 includes a midsole 440. In one configuration, the midsole 440 is formed by one or more steps illustrated in FIG. 10. For example, a third heel material (not shown) may be introduced into molding system 300. In some configurations, the third heel material is less rigid than the second heel material 310. In one configuration, the first plate member 402 serves as an upper surface of a molding cavity for the third heel material (not shown).

In some instances, it may be desired to show a portion of the upper. Accordingly, in some configurations, the notch region 410 extends into the midsole 440. For example, as shown in FIG. 17, the medial edge 412 extends through the midsole 440 to the upper (not shown) and the lateral edge 414 extends through the midsole 440 to the upper. As such, a bottom surface of the upper may be visible, thereby improving an aesthetic appearance of the article 400.

In one configuration, the notch region 410 extends in a substantially longitudinal direction of the article 400. For example, as shown in FIG. 17, the notch region 410 extends along a central axis 420. In some configurations, the midfoot region 134 extends along the central axis 420.

The following Clauses provide methods of manufacturing the article of footwear 100 described above.

Clause 1: A method of making an article of footwear may include providing a molding system including a molding cavity and a molding top, the molding cavity having a first region and a second region; placing a first cleat into the first region of the molding cavity; placing a second cleat into the second region of the molding cavity; providing a first material comprising a first rigid member and a second rigid member; placing the first rigid member into the first region, the first rigid member being spaced from the first cleat; placing the second rigid member into the second region, the second rigid member being spaced from the second cleat; placing the molding top onto the molding cavity; injecting a second material into the first region and into the second region to form a sole comprising a first plate member and a second plate member; wherein the second material directly contacts the first cleat and the second material directly contacts the first rigid member and wherein the second material adheres the first cleat to the first rigid member; wherein the second material directly contacts the second cleat and the second material directly contacts the second rigid member and wherein the second material adheres the second cleat to the second rigid member; and wherein the first plate member has a first edge having a first contour corresponding to a second contour of a second edge of the second plate member.

Clause 2: The method according to Clause 1, wherein the first plate member further includes a heel region formed of the second material; wherein the heel region separates a notch region from a medial side of the article of footwear; wherein the heel region separates the notch region from a lateral side of the article of footwear; and wherein the notch region extends from an outer edge of a heel portion of the article of footwear towards a forefoot portion of the article of footwear.

Clause 3: The method according to Clause 2, wherein the notch region extends in a substantially longitudinal direction of the article of footwear on a centrally located position of the article of footwear.

Clause 4: The method according to Clause 3, wherein the first rigid member extends in the substantially longitudinal direction of the article of footwear on the centrally located position.

Clause 5: The method according to any one of Clauses 2-4, wherein the molding system further includes a second molding top, the method further comprising the steps of: removing the first molding top; wherein an upper surface of the first plate member and an upper surface of the second plate member form a second molding cavity; placing the second molding top onto the second molding cavity; and injecting a third material into the second molding cavity.

Clause 6: The method according to Clause 5, wherein the third material attaches the first plate member to an upper for the article of footwear; and wherein the third material attaches the second plate member to the upper.

Clause 7: The method according to Clauses 5 or 6, wherein the third material is less rigid than the second material.

Clause 8: The method according to any one of Clauses 5-7, wherein the third material is absent from the notch region.

Clause 9: The method according to anyone of Clauses 1-8, wherein the second material extends on an upper surface of a flange of the first cleat and wherein the second material extends on a lower surface of the flange of the first cleat; and wherein the second material extends on an upper surface of a flange of the second cleat and wherein the second material extends on a lower surface of the flange of the second cleat.

Clause 10: The method according to anyone of Clauses 1-9, wherein the second material forms a rib, the rib extending from an outer surface of the first rigid member; and wherein the rib has a shape corresponding to a shape of the first plate member.

Clause 11: The method according to anyone of Clauses 1-10, wherein the first material comprises a plurality of carbon fibers; and wherein the second material is an elastomer.

Clause 12: The method according to anyone of Clauses 1-11, wherein the second material attaches to sides of the first material.

Clause 13: The method according to any one of Clauses 1-12, wherein the step of placing the first rigid member into the first region positions the first rigid member closer to the molding top than to the first cleat; and wherein the step of placing the second rigid member into the second region positions the second rigid member closer to the molding top than to the second cleat.

Clause 14: The method according to any one of Clauses 1-13, wherein the first material is releasably attached to the molding top and wherein the first material is removed from the molding top after the injecting the second material into the first region and into the second region.

Clause 15: The method according to anyone of Clauses 1-14, wherein the first rigid member extends along the first contour, the first rigid member maintaining a substantially constant first distance from the first edge; and wherein the second rigid member extends along the second contour, the second rigid member maintaining a substantially constant second distance from the second edge.

Clause 16: An article of footwear comprising the article of footwear manufactured in accordance with the method of any of Clauses 1 to 15.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method comprising:
inserting at least one cleat into a first mold half of a mold;
inserting a first reinforcement member into a second mold half of the mold;
attaching the first reinforcement member to the second mold half;
closing the mold to define a first cavity between the first mold half including the at least one cleat and the second mold half including the first reinforcement member;
maintaining a first gap between the at least one cleat and the first reinforcement member after the mold is closed;
injecting a first material into the first cavity and within the first gap to form a sole plate including the first material, the at least one cleat, and the first reinforcement member; and
attaching the sole plate to an article of footwear.

2. The method of claim 1, further comprising separating the first mold half and the second mold half following formation of the sole plate to expose a surface of the sole plate within the first mold half.

3. The method of claim 2, further comprising defining a second cavity between the first mold half and a third mold half, the first mold half having the sole plate disposed therein.

4. The method of claim 3, further comprising injecting a second material into the second cavity to form a midsole of the article of footwear.

5. The method of claim 4, wherein injecting the second material into the second cavity attaches the sole plate to the midsole.

6. The method of claim 4, wherein injecting the second material into the second cavity causes the second material to contact the first reinforcement member.

7. The method of claim 4, wherein injecting the second material into the second cavity includes injecting a material having less stiffness than the first material.

8. The method of claim 1, wherein attaching the first reinforcement member to the second mold half includes attaching the first reinforcement member to the second mold half via a releasable adhesive.

9. The method of claim 1, wherein inserting the at least one cleat into the first mold half includes forming a second gap between a portion of the at least one cleat and a surface of the first mold half on an opposite side of the at least one cleat than the first gap.

10. The method of claim 9, wherein injecting the first material into the first cavity includes injecting the first material into the second gap.

11. A method comprising:
 inserting at least one cleat into a first mold half of a mold;
 inserting a first reinforcement member into a second mold half of the mold;
 closing the mold to define a first cavity between the first mold half including the at least one cleat and the second mold half including the first reinforcement member;
 maintaining a first gap between the at least one cleat and the first reinforcement member after the mold is closed;
 injecting a first material into the first cavity and within the first gap to form a sole plate including the first material, the at least one cleat, and the first reinforcement member;
 defining a second cavity between the first mold half and a third mold half, the first mold half having the sole plate disposed therein;
 injecting a second material into the second cavity to form a midsole of an article of footwear including the sole plate and the second material; and
 attaching the midsole to an upper to form the article of footwear.

12. The method of claim 11, further comprising separating the first mold half and the second mold half following formation of the sole plate to expose a surface of the sole plate within the first mold half.

13. The method of claim 11, wherein injecting the second material into the second cavity causes the second material to contact the first reinforcement member.

14. The method of claim 11, wherein injecting the second material into the second cavity includes injecting a material having less stiffness than the first material.

15. The method of claim 11, further comprising attaching the first reinforcement member to the second mold half before closing the mold to define the first cavity.

16. The method of claim 11, wherein inserting the at least one cleat into the first mold half includes forming a second gap between a portion of the at least one cleat and a surface of the first mold half on an opposite side of the at least one cleat than the first gap.

17. The method of claim 16, wherein injecting the first material into the first cavity includes injecting the first material into the second gap.

* * * * *